(12) United States Patent
Miyazaki et al.

(10) Patent No.: US 9,829,041 B2
(45) Date of Patent: Nov. 28, 2017

(54) ROLLING BEARING

(71) Applicant: NTN CORPORATION, Osaka (JP)

(72) Inventors: Hiroyuki Miyazaki, Mie (JP); Kiyoshige Yamauchi, Mie (JP); Yoriko Kosaka, Mie (JP); Hisa Kishida, Mie (JP)

(73) Assignee: NTN CORPORATION, Osaka (JP)

( * ) Notice: Subject to any disclaimer, the term of this patent is extended or adjusted under 35 U.S.C. 154(b) by 29 days.

(21) Appl. No.: 14/894,425

(22) PCT Filed: May 27, 2014

(86) PCT No.: PCT/JP2014/063930
§ 371 (c)(1),
(2) Date: Nov. 27, 2015

(87) PCT Pub. No.: WO2014/192724
PCT Pub. Date: Dec. 4, 2014

(65) Prior Publication Data
US 2016/0108962 A1    Apr. 21, 2016

(30) Foreign Application Priority Data

May 28, 2013 (JP) .................................. 2013-111924
Apr. 4, 2014 (JP) .................................. 2014-077643

(51) Int. Cl.
F16C 19/00    (2006.01)
F16C 33/66    (2006.01)
(Continued)

(52) U.S. Cl.
CPC .......... *F16C 33/667* (2013.01); *F16C 19/364* (2013.01); *F16C 33/7813* (2013.01);
(Continued)

(58) Field of Classification Search
CPC .. F16C 33/667; F16C 33/726; F16C 33/7846; F16C 33/7863; F16C 33/7866; F16C 33/80; F16C 33/805
See application file for complete search history.

(56) References Cited

U.S. PATENT DOCUMENTS 2,237,616 A    4/1941  Smith
3,994,545 A *  11/1976 Van Dorn ............ F16J 15/3204
                                                      384/482
(Continued)

FOREIGN PATENT DOCUMENTS

DE    90 02 218    4/1990
DE    43 29 398    7/1994
(Continued)

OTHER PUBLICATIONS

Office Action dated Feb. 28, 2017 in Japanese Application No. 2013-111924, with English translation.
(Continued)

*Primary Examiner* — James Pilkington
(74) *Attorney, Agent, or Firm* — Wenderoth, Lind & Ponack, L.L.P.

(57) ABSTRACT

A rolling bearing includes an outer bearing race and an inner bearing race defining a bearing space therebetween. Rolling elements are mounted in the bearing space. A seal device is at one axial opening of the bearing space and includes a metal ring member with through holes configured such that lubricating oil can pass through the through holes and solid foreign substances cannot pass through the through holes. One of the outer bearing race and the inner bearing race is stationary, and the other is rotatable. The metal ring member is in engagement with the stationary bearing race. A metal or resin sub-ring member, which is a separate member from the metal ring member, is fixed to the rotatable bearing race.
(Continued)

Between the metal ring member and the metal or resin sub-ring member, a gap is defined which constitutes a labyrinth seal structure.

20 Claims, 11 Drawing Sheets

(51) Int. Cl.
  *F16C 33/80* (2006.01)
  *F16C 33/78* (2006.01)
  *F16C 19/36* (2006.01)
(52) U.S. Cl.
  CPC ...... *F16C 33/7846* (2013.01); *F16C 33/7866* (2013.01); *F16C 33/80* (2013.01); *F16C 33/7863* (2013.01)

(56) References Cited

U.S. PATENT DOCUMENTS

| | | | | |
|---|---|---|---|---|
| 5,492,416 | A | | 2/1996 | Gabelli et al. |
| 5,513,918 | A | * | 5/1996 | Wan ............... F16C 33/667 210/171 |
| 5,676,383 | A | * | 10/1997 | Chandler ............ F16C 33/7853 277/559 |
| 2004/0028305 | A1 | | 2/2004 | Akagami et al. |
| 2013/0077905 | A1 | * | 3/2013 | Shimizu ............. F16C 33/7813 384/445 |
| 2014/0011622 | A1 | | 1/2014 | Sone et al. |
| 2015/0337902 | A1 | * | 11/2015 | Shimizu ............. F16C 33/667 384/474 |

FOREIGN PATENT DOCUMENTS

| | | |
|---|---|---|
| DE | 199 58 788 | 6/2001 |
| DE | 10 2006 033 124 | 1/2008 |
| EP | 2 578 894 | 4/2013 |
| JP | 43-24167 | 10/1968 |
| JP | 62-170828 | 10/1987 |
| JP | 6-34711 | 5/1994 |
| JP | 6-323335 | 11/1994 |
| JP | 2000-55064 | 2/2000 |
| JP | 2001-304278 | 10/2001 |
| JP | 2002-58201 | 2/2002 |
| JP | 2002-266876 | 9/2002 |
| JP | 2003-4035 | 1/2003 |
| JP | 2003-80560 | 3/2003 |
| JP | 2004-044719 | 2/2004 |
| JP | 2010-101332 | 5/2010 |
| JP | 2011-069421 | 4/2011 |
| JP | 2012-189101 | 10/2012 |
| JP | 2012-197807 | 10/2012 |
| JP | 2012-211692 | 11/2012 |
| JP | 2013-104484 | 5/2013 |

OTHER PUBLICATIONS

Extended European Search Report issued Jun. 16, 2016 in corresponding European Application No. 14804648.5.
International Search Report dated Aug. 19, 2014 in corresponding International Application No. PCT/JP2014/063930.
Written Opinion of the International Search Authority dated Aug. 19, 2014 in corresponding International Application No. PCT/JP2014/063930 (with English translation).
Japanese Office Action dated Oct. 3, 2017 in Japanese Patent Application No. 2013-111924, with English translation.

* cited by examiner (a) (b)

| | | 25 | 40 | 50 | 60 | 70 | 80 | 90 | 100 |
|---|---|---|---|---|---|---|---|---|---|
| Inner diameter of seal lip | Temperature | °C | 25 | 40 | 50 | 60 | 70 | 80 | 90 | 100 |
| | Amount of temperature rise | °C | 0 | 15 | 25 | 35 | 45 | 55 | 65 | 75 |
| | Amount of expansion of inner diameter | mm | — | 0.299 | 0.499 | 0.698 | 0.897 | 1.097 | 1.296 | 1.496 |
| Outer diameter of Inner race | Temperature | °C | 25 | 50 | 60 | 70 | 80 | 90 | 100 | 110 |
| | Amount of temperature rise | °C | 0 | 25 | 35 | 45 | 55 | 65 | 75 | 85 |
| | Amount of expansion of inner diameter | mm | — | 0.031 | 0.044 | 0.056 | 0.069 | 0.081 | 0.094 | 0.106 |
| Interference of fitting portions : φ | | mm | 0.30 | 0.03 | −0.15 | −0.34 | −0.53 | −0.72 | −0.90 | −1.09 |

# ROLLING BEARING

BACKGROUND OF THE INVENTION

1. Field of the Invention

This invention relates to an oil-lubricated rolling bearing, and particularly a rolling bearing configured to be lubricated by oil which flows into the bearing through a filter capable of preventing entry of foreign substances in the lubricating oil.

2. Description of the Related Art

Rolling bearings are mounted in power transmission mechanisms, such as transmissions, differentials and speed reducers, of transportation machinery such motor vehicles, and of construction machinery, travel units including the above-mentioned power transmission mechanisms, hydraulic pumps, and in various other industrial machinery.

Foreign substances such as wear dust (such as iron dust) from gears tend to be mixed into oil used to lubricate the above-mentioned rolling bearings, especially where the oil is used to lubricate both such rolling bearings and a power transmission mechanism.

If foreign substance infiltrate into a rolling bearing, they tend to get stuck between components of the bearing, thus causing peeling on the raceways and rolling surfaces, which reduces the durability of the rolling bearing.

In order to prevent entry of foreign substances, rolling bearings are proposed which includes a filter provided on a seal ring attached to the rolling bearing. The filter is a separate member from the seal ring, and attached to an oil flow hole formed in the seal ring to capture foreign substances.

The below-identified JP Patent Publication 6-323335A (see e.g. page 5 and FIGS. 1 to 3) discloses such a rolling bearing, including a seal ring made of an elastomer (hereinafter referred to as the "elastic seal member") and formed with an opening covered with a filter. The elastic seal member is directly mounted to one of the inner and outer races of the bearing. The elastic seal member is provided with a seal lip kept in contact with the other of the inner and outer races.

The rolling bearing disclosed in JP Patent Publication 6-323335A includes a seal ring made of an elastomer (hereinafter referred to as the "elastic seal member") and formed with an oil flow hole covered with a filter. The elastic seal member is directly mounted to one of the inner and outer races of the bearing.

The elastic seal member of this rolling bearing, which is made of an elastomer, is exposed to the opening of the bearing, i.e. to the seal fitting portion, with no metal core. Thus, if a larger-than-expected external force is applied to the elastic seal member while, for example, assembling the bearing, during transportation of the bearing, or when mounting the bearing into machinery, the elastic seal member could be elastically deformed, or moved out of the correct mounting position, thus losing its sealing capability.

In order to prevent the loss of its sealing capability, it is necessary to control the interference between the elastic seal member and the bearing with high accuracy.

However, since the elastic seal member is directly mounted to the bearing, in order to further improve the accuracy of the interference, it is necessary to further improve the accuracy of the dimensions of the elastic seal member and the bearing, which, however, adds to the manufacturing cost. Also, there is a limit to the extent to which the dimensional accuracy of the elastic seal member, which is formed from an elastic material, can be improved.

Also, if the interference is increased to ensure sufficient sealability, the bearing torque will also increase. In the arrangement in which the seal lip is in contact with the bearing race, when the bearing is rotated at high speed, the bearing tends to overheat, or the seal lip tends to become worn prematurely.

In the rolling bearing disclosed in JP Patent Publication 6-323335A, which includes a filter, since the seal lip is in contact with the bearing race to which the elastic seal member is not fixed, when the bearing is rotated at high speed, the bearing torque and the bearing temperature will rise, and the seal lip tends to become worn prematurely.

SUMMARY OF THE INVENTION

An object of the present invention is to reliably prevent entry of foreign substances in lubricating oil into the bearing, and to improve reliability, and extend the life, of the seal device of a rolling bearing including a filter.

In order to achieve this object, the present invention provides a rolling bearing comprising an outer bearing race and an inner bearing race defining a bearing space between the outer bearing race and the inner bearing race, rolling elements mounted in the bearing space, and a seal device provided at one of axial openings of the bearing space and including a ring member formed of a metal or a resin and formed with through holes configured such that lubricating oil can pass through the through holes and solid foreign substances cannot pass through the through holes.

Since the seal device includes a ring member made of a metal or a resin and formed with through holes, this seal device is resistant to deformation (less likely to be deformed) under an external force, compared to a conventional elastic seal member made of an elastomer. The seal device is therefore securely fixed to the bearing race, so that it is less likely to lose its sealability. Since the ring member is made of a metal or a resin, it is less likely to be disconnected from the bearing race under a large external force. The seal device is therefore sufficiently durable and shows a long life.

Since the rolling bearing according to the present invention maintains high sealability even under harsh use conditions, even if the bearing is used in a harsh environment in which foreign substances are mixed into lubricating oil, and foreign objects are actually mixed into the lubricating oil, it is possible to prevent entry of foreign substances which are so large as to be harmful to the bearing, into the bearing.

Metals usable for the ring member include stainless steel. Resins usable for the ring member include resins other than elastomers (rubbers), which are used for conventional elastic seal members. By way of example, the ring member may be formed from a hard plastic, or from a glass fiber-reinforced resin.

This rolling bearing may be configured such that one of the outer bearing race and the inner bearing race constitutes a stationary bearing race, and the other of the outer bearing race and the inner bearing race constitutes a rotatable bearing race, wherein the ring member is in engagement with the stationary bearing race, and wherein a gap constituting a labyrinth seal structure is defined between the ring member and the rotatable bearing race.

Alternatively, the rolling bearing may be configured such that one of the outer bearing race and the inner bearing race constitutes a stationary bearing race, and the other of the outer bearing race and the inner bearing race constitutes a rotatable bearing race, wherein the ring member is in engagement with the stationary bearing race, wherein the seal device further includes a sub-ring member formed of a metal or a resin and fixed to the rotatable bearing race, and wherein a gap constituting a labyrinth seal structure is defined between the ring member and the sub-ring member.

Since a labyrinth structure is defined between the ring member and the rotatable bearing race, or between the ring member and the sub-ring member fixed to the rotatable bearing race, sealing effects are obtainable even though the opposed members are not in contact with each other. This further improves the durability of the seal device. In particular, since the seal device does not include a conventional elastic seal member made of an elastomer, and the members which rotate about the axis of the bearing relative to each other are not in contact with each other, the rolling bearing is resistant to wear and damage, and thus shows a long life. Also, since these members are not in contact with each other, the bearing is prevented from overheating.

While the ring member is formed with through holes, through holes may not be formed in the sub-ring member. The ring member, which is formed with through holes, is fitted to the fixed bearing ring (i.e. to the outer bearing race if the inner bearing race is rotatable and the outer bearing race is stationary, and to the inner race if the outer race is rotatable and the inner race is stationary). The sub-ring member, which is not formed with through holes, is fitted to the rotatable bearing race (i.e. to the inner bearing race if the inner bearing race is rotatable and the outer bearing race is stationary, and to the outer bearing race if the outer bearing race is rotatable and the inner bearing race is stationary. With this arrangement, since no member formed with holes is fitted to the rotatable bearing race, lubricating oil can be sufficiently distributed in the bearing while the bearing is rotating.

However, if lubricating oil can be distributed in the bearing to a certain extent, the sub-ring member may also be formed with through holes configured such that lubricating oil can pass through the through holes and solid foreign substances cannot pass through the through holes.

If the sub-ring member is used, a pull-out prevention means may be provided between the sub-ring member and the rotatable bearing race. Another axial pull-out prevention means may be provided between the ring member and the stationary bearing race. One of the pull-out prevention means for the ring member and for the sub-ring member may be omitted.

By providing the pull-out prevention means between the ring member, which is a separate member, and the corresponding bearing race, and between the sub-ring member and the corresponding bearing race, it is possible to prevent wear due to relative slippage between the ring member and the sub-ring member and the respective bearing races to which these members are fitted, thereby preventing deterioration in sealing properties.

Each of the pull-out prevention means may comprise a recess and a protrusion formed in the respective radially or axially abutting surfaces of the ring member or the sub-ring member and the corresponding bearing race such that the protrusion is engaged in the recess; or comprise a coupling member such as a pin or a bolt which couples the ring member or the sub-ring member to the corresponding bearing race. Alternatively, each of the pull-out prevention means may comprise an adhesive through which the ring member or the sub-ring member is bonded to the corresponding bearing race. Further alternatively, each of the pull-out prevention means may comprise rough surfaces formed on the abutting surfaces of the ring member or the sub-ring member and the corresponding bearing race. Such rough surfaces may comprise satin-finished surfaces, embossed surfaces, or straight knurled surfaces. Further, each of the pull-out prevention means or anti-rotation means may comprise a combination of more than one of the above arrangements.

The ring member may be fitted to the stationary bearing race with an interference fit, and/or the sub-ring member (30) may be fitted to the rotatable bearing race with an interference fit.

The through holes of the ring member may be formed over the entire surface of the ring member or only at a portion of the surface that is not fitted to the stationary bearing race, and the ring member may be an annular member formed by pressing a metal or by injection-molding a resin.

If an annular metal member is used as the ring member formed with the through holes, such an annular metal member may be formed from punched metal. By using an annular metal member as the ring member, the durability of the seal device improves, and it is also possible to prevent entry of harmful foreign substances into the bearing, while supplying lubricating oil necessary for lubrication of the bearing into the bearing. This is because such an annular metal ring is higher in rigidity than an elastomer, and is resistant to deformation under an external force.

If the sub-ring member formed with through holes is used, an annular metal member (formed from e.g. punched metal) may be used for the sub-ring member too. By using an annular metal member as the sub-ring member, the durability of the seal device improves.

The ring member formed with through holes is fitted to one of the outer bearing race and the inner bearing race, and the seal device further includes a lip made of a material softer than the ring member (20) and joined to the ring member so as to face the other of the outer bearing race and the inner bearing race.

By joining a lip made of a relatively soft material to the ring member having an integral filter, the ring member is fixedly fitted to the one of the bearing races, allowing the filter to maintain its function for a prolonged period of time, while the lip can maintain its sealing function between the lip and the other bearing race in an optimum manner.

The lip may be formed from an elastomer. Then, the ring member is made of a material harder than the elastomer forming the lip. The ring member may be made of a metal or a resin.

In conventional rolling bearings including a filter, an elastomer member forming the body of the seal device is directly fixed to a bearing race, while according to the present invention, the relatively hard ring member is fixed to one of the bearing races, while the soft lip is not directly fixed to the other bearing race. This eliminates the necessity to control the dimensions of the soft member such as the elastomer member and the dimensions of the various elements of the bearing as strictly as with the conventional bearings.

Since the ring member is more resistant to deformation under an external force than the lip, even if the bearing is used in a harsh environment in which foreign substances are mixed into lubricating oil, it is possible to prevent entry of foreign substances which are harmful to the bearing, into the bearing over a long period of time, thus to prolong the life of the bearing.

In this arrangement, the seal device may further includes a sub-ring member fitted to the other bearing race so as to face the lip joined to the ring member, such that a labyrinth structure is defined between the sub-ring member and the ring member.

By using the labyrinth structure, a desired seal effect is obtainable while keeping the rotatable member and the stationary member out of contact with each other, so that it is possible to prolong the life of ring member and the lip.

In any of the above arrangements, the lip may be configured such that while the outer bearing race and the inner bearing race are not rotating or rotating at a low speed about an axis, relative to each other, the lip comes into contact with the other bearing race or a member fixed to the other bearing race, and while the outer bearing race and the inner bearing race are rotating at a high speed about the axis relative to each other, the lip is kept out of contact with the other bearing race or the member fixed to the other bearing race.

In particular, since the lip made of a relatively soft material is joined to the ring member having an integral filter, while the bearing is not rotating or rotating at a low speed, the lip comes into contact with the bearing race to which the ring member is not fitted or the member fitted to this bearing race (such as the sub-ring member), thereby preventing entry of foreign substances.

While the bearing is rotating at a high speed, the lip is configured such that a gap forms between the lip and the bearing race opposed to the lip or the member fixed to this bearing race, due to a difference in the degree of thermal expansion between the lip and the bearing race opposed to the lip or the member fixed to this bearing race because they are made of different materials whose linear expansion coefficients differ from each other. With this arrangement, it is possible to prevent an increase in bearing torque and a rise temperature, and also prevent excessive wear of the lip even though the lip is made of a soft material.

The gap that forms between the lip and the bearing race opposed to the lip or the member fitted to this bearing race while the bearing is rotating at a high speed is determined so as to be smaller in size than any foreign substances that could badly influence the life of the bearing, thus more reliably preventing a reduction in the life of the bearing. The gap that forms between the above two members while the bearing is rotating at a high speed can be calculated based on the rate at which the temperature rises and the linear expansion coefficients of the above two members.

In any of the above arrangements, the ring member may be fitted to the stationary one of the inner bearing race and the outer bearing race. If the sub-ring member is used in this arrangement, the sub-ring member is fitted to the rotatable bearing race.

By fitting the ring member having a filter through which lubricating oil passes to the stationary (fixed) bearing race, the filter does not rotate, so that lubricating oil can be smoothly supplied into the bearing while the bearing is rotating. Thus, the filter is preferably mounted to the stationary side.

Thus, if the inner bearing race is the rotatable bearing race, and the outer bearing race is the stationary bearing race, the ring member is preferably fitted to the outer bearing race. If, conversely, the inner bearing race is the stationary bearing race, and the outer bearing race is the rotatable bearing race, the ring member is preferably fitted to the inner bearing race.

The filter may be formed over the entire surface of the ring member or only at a portion of said surface that is not fitted to said one of the outer bearing race and the inner bearing race.

The ring member may be one of an annular member made of a metal, of which the through holes (23) are formed in large number by pressing to provide the ring member (20) with a function of a filter (F), and an annular member made of a synthetic resin, of which the through holes (23) are formed in large number by injection molding to provide the ring member (20) with a function of a filter (F).

By using an annular metal member formed with a large number of holes as the ring member, the ring member can be manufactured easily and is more resistant to deformation under an external force than the lip which is made of a soft material such as an elastomer. Such an annular metal member may comprise a punched metal.

By keeping the ring member and the auxiliary ring member out of contact with each other by defining a labyrinth structure therebetween, lubricating oil can be circulated to a certain extent between the interior and exterior of the bearing, while ensuring sealability. This prevents overheating of the bearing. A filter may or may not be formed on the sub-ring member (auxiliary ring member). In particular, holes may not be formed in the sub-ring member, which is in the form of an annular metal member or an annular resin member, or made of any other material.

In any of these arrangements, the through holes preferably have diameters (maximum diameters) in the range of 0.3 to 0.7 mm. If the through holes form a net, their mesh sizes are preferably in the range of 0.3 to 0.7 mm.

According to the present invention, since the seal device includes a ring member made of a metal or a resin and formed with through holes, it is resistant to deformation under an external force compared to a conventional elastic seal member comprising an elastomer only. Thus, the seal device can be secured to a bearing race, which prevents impairment of sealability, improves durability of the seal device, and extends its life.

According to this invention, since a lip made of a relatively soft material such as an elastomer is joined to a ring member integrally formed with a filter, the ring member can be securely fixed to one of the bearing races, so that the filter can perform its function over a prolonged period of time, while the lip can maintain high sealability between the lip and the other bearing race.

Since the ring member, which is made of a relatively hard material, is fitted to one of the bearing races, while the soft lip is not directly fixed to the other bearing race, it is not necessary to control the dimensions of the member made of a soft material such as an elastomer as strictly as in conventional arrangements. Since the ring member is resistant to deformation under an external force, even if the bearing is used in a harsh environment in which foreign substances tend to mix into lubricating oil, the seal device can reliably prevent entry of foreign substance harmful to the bearing into the bearing over a prolonged period of time, and thus prolong the life of the bearing.

BRIEF DESCRIPTION OF THE DRAWINGS

FIG. 17 is a table showing the relationships between the inner diameter of the (seal) lip, the outer diameter of the inner bearing race, and the fitting interference.

DETAILED DESCRIPTION OF THE INVENTION

Figure 1:
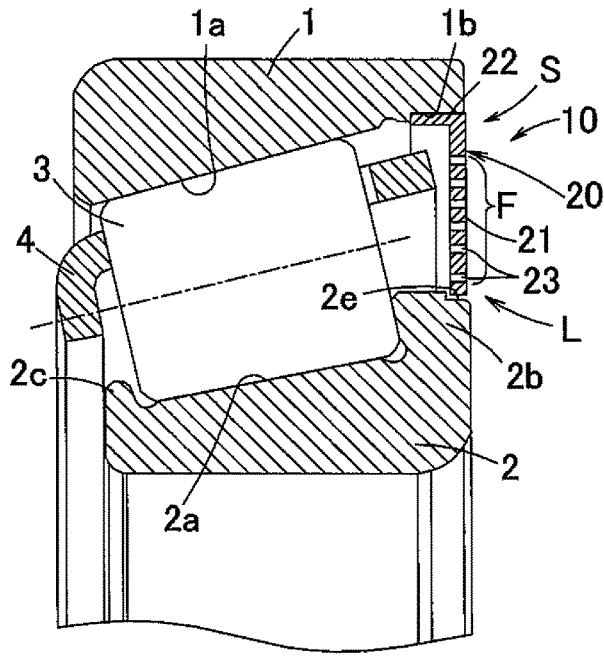
FIG. 1 is a partial enlarged sectional view of a first embodiment according to the present invention.

Now referring to the drawings, the embodiments of the present invention are described. While the rolling bearings 10 of the first to fifth embodiments are tapered roller bearings which are supposed to be used in travel units of various transporting and construction machinery, the present invention is applicable to rolling bearings used for other purposes.

FIG. 1 shows a partial enlarged sectional view of a rolling bearing 10 according to the first embodiment of the present invention. The rolling bearing 10 includes an outer bearing race 1, an inner bearing race, and rolling elements 3 in the form of tapered rollers mounted in the bearing space defined between the outer bearing race 1 and the inner bearing race 2. The rolling elements 3 are received between a large flange 2b and a small flange 2c of the inner bearing race 2, and are retained in position in the circumferential direction by a retainer 4. The inner bearing race 2 and the outer bearing race 1 has raceways 2a and 1a, respectively, which are arranged such that the distance therebetween decreases from one axial end (right-hand side in FIG. 1) toward the other axial end (left-hand side in FIG. 1).

A seal device S is mounted to one of the openings of the bearing space of the rolling bearing 10 at its respective axial ends. The seal device S comprises a metal ring member 20 formed with through holes 23 through which lubricating oil can pass and solid foreign objects cannot. Ordinarily, a single such seal device S is mounted to one of the openings of the bearing space at its respective ends. However, if necessary, two such seal devices S may be mounted to the respective openings.

As shown in FIG. 1, the ring member 20 of the seal device S includes a fitting portion (engaging portion) 22 fitted in a fitting recess 1b formed in the inner surface of the outer bearing race 1 with an interference fit, and a side portion (wall portion) 21 extending radially inwardly from the fitting portion 22 so as to be integral with the fitting portion 22.

Figure 7:
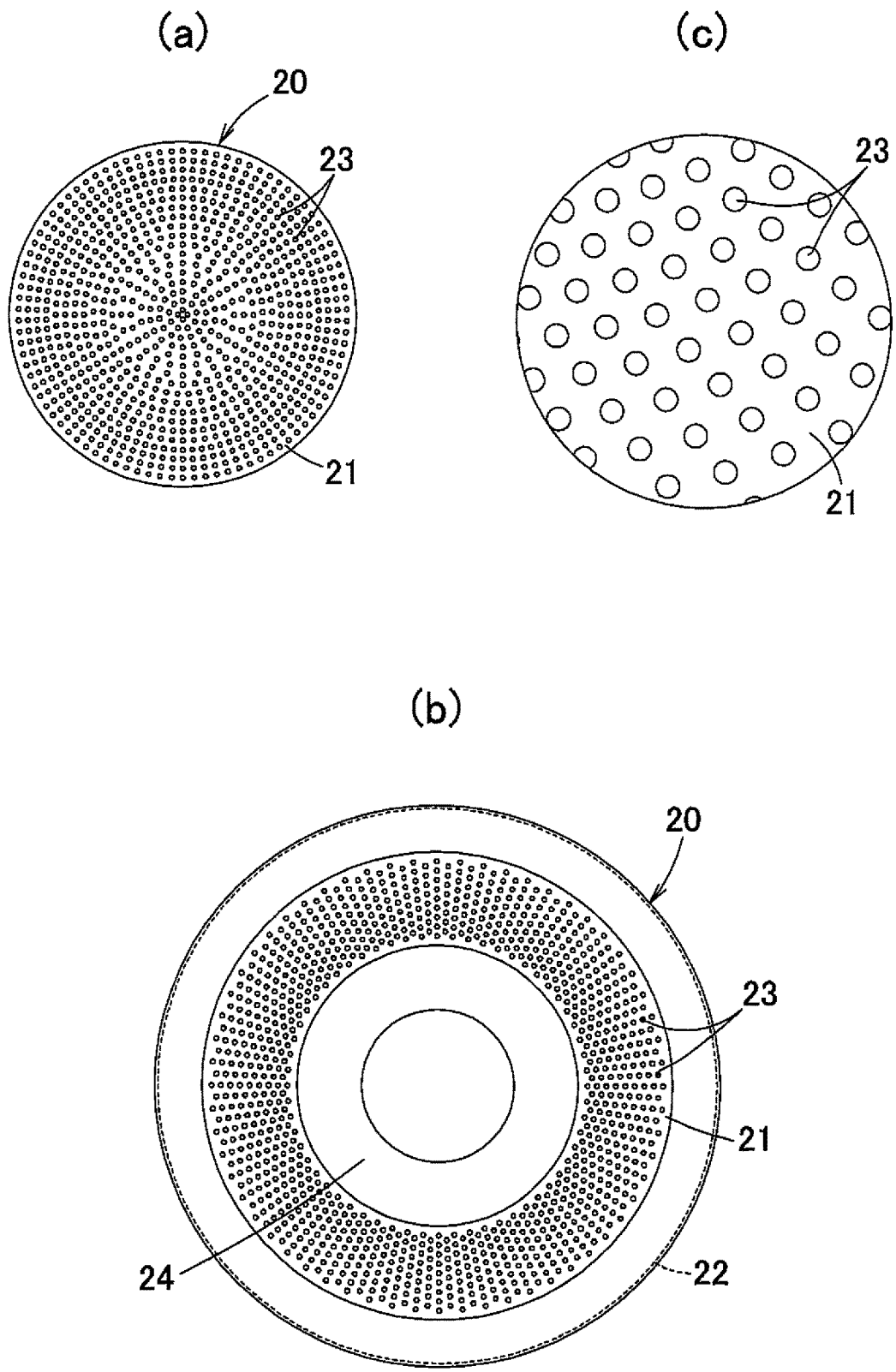
FIGS. 7(a) to 7(c) are detailed views of the through holes.

The ring member 20 may be, as shown in FIG. 7, a member formed by pressing a metal. The side portion 21 is formed with a large number of through hole 23 by pressing such that the side portion 21 serves as a filter F capable of capturing any harmful foreign substances contained in lubricating oil. In this embodiment, the ring member 20 is manufactured from a punched metal blank comprising stainless steel.

In this embodiment, the outer bearing race 1 is stationary, and the inner bearing race 2 is rotatable. The ring member 20 is kept in engagement with the stationary outer bearing race 1, and has a distal edge which defines, in cooperation with a recess 2e formed in the large flange 2b of the rotatable inner bearing race 2, a gap that constitutes a labyrinth seal (structure) L.

The labyrinth seal L improves the sealing effect between the ring member 20 and the rotatable bearing race even though their opposed portions are not in contact with each other, thus improving the durability of the seal device S. In particular, since these two members, which rotate relative to each other about the axis of the bearing are not in contact with each other, the rolling bearing is resistant to wear and damage, and thus will have a longer life. Also, since these members are not in contact with each other, excessive heat buildup of the bearing is prevented.

Since the seal device S comprises the metal ring member 20 formed with the through holes 23, the seal device S has a higher rigidity than a conventional elastic seal member which comprises an elastomer, and thus is less likely to be deformed under external force. The seal device S can thus be securely fixed to the bearing race and keeps high sealability. Since the metal ring member 20 is less likely to separate from the bearing race under a large external force, the seal device S is durable and will have a long life.

Figure 2:
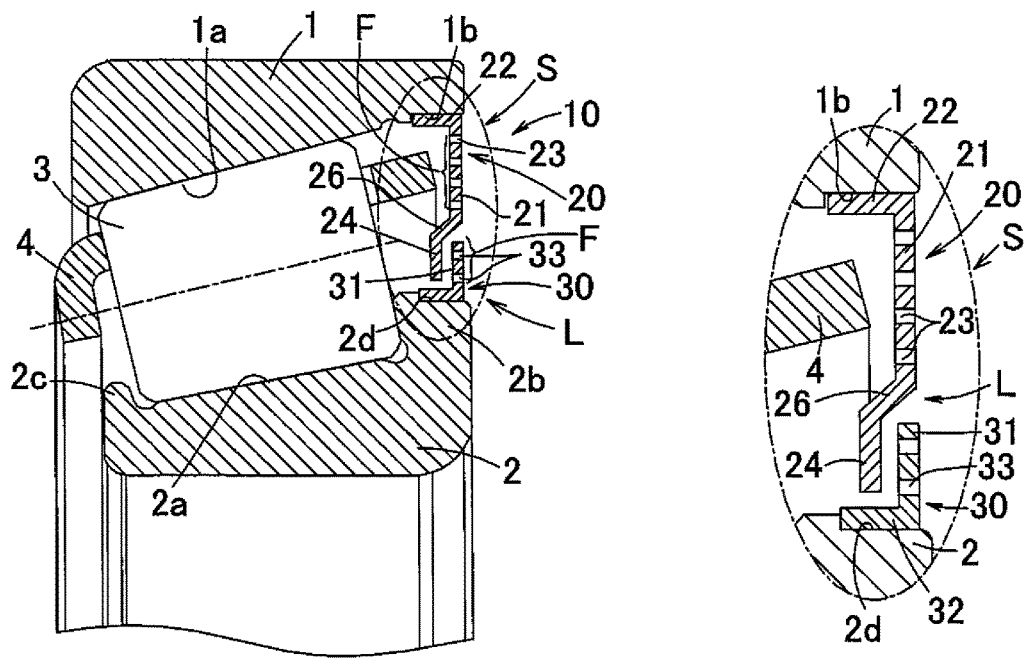
FIG. 2(a) is a partial enlarged sectional view of a second embodiment according to the present invention.
FIG. 2(b) is a partial enlarged view of FIG. 2(a).

FIGS. 2(a) and 2(b) show a rolling bearing 10 according to the second embodiment of the present invention. Since the main elements of this rolling bearing 10 are the same as those of the first embodiment, what differs, in the seal device S, from that of the first embodiment is now mainly described. In this embodiment, too, the outer bearing race 1 is stationary, and the inner bearing race 2 is rotatable.

As shown in FIG. 2(a), the seal device S of the second embodiment includes a ring member 20 constituted by a fitting portion 22 fitted in a fitting recess 1b formed in the outer bearing race 1 with an interference fit, and a side portion 21 extending radially inwardly from the fitting portion 22 so as to be integral with the fitting portion 22. The seal device S further includes a sub-ring member (auxiliary ring member) 30 constituted by a fitting portion 32 fitted in a fitting recess 2d formed in the inner bearing race 2 with an interference fit, and a side portion 31 extending radially outwardly from the fitting portion 32 so as to be integral with the fitting portion 32.

The ring member 20 also has a relief portion 24 at the radially inner edge thereof. The relief portion 24 is a plate-shaped portion having surfaces extending parallel to the surfaces of the side portion 21, and slightly displaced toward the rolling elements 3 from the side portion 21. The relief portion 24 is connected to the side portion 21 by a connecting portion 26 inclined radially inwardly toward the rolling elements 3. The connecting portion 26 thus has conical surfaces.

The ring member 20 is fixed to the stationary bearing race, while the sub-ring member 30 is fixed to the rotatable bearing race, thereby defining a gap, as a labyrinth seal L, between the relief portion 24 and the connecting portion 26, of the ring member 20, and the fitting portion 32 and the side portion 31, of the sub-ring member 30.

Each of the ring member 20 and the sub-ring member 30 is formed by pressing a metal. The ring member 20 and the sub-ring member 30 are formed with large numbers of through holes 23 and 33 in their respective side portions 21 and 31 such that the side portions 21 and 31 serve as filters F capable of capturing harmful foreign substances contained in lubricating oil. In this embodiment, each of the ring member 20 and the sub-ring member 30 is manufactured from a punched metal blank comprising stainless steel.

Since the seal device S of the second embodiment operates in the same manner and provides the same advantages, as the seal device of the first embodiment, the description of its operation and advantages is omitted.

While it is essential to provide the ring member 20, mounted to the stationary bearing race, with the filter F having the through holes 23, it is not essential to provide the sub-ring member 30, mounted to the rotatable bearing race, with the filter F having the through holes 33. The through holes 33 of the sub-ring member 30 may thus be omitted. By omitting the through holes 33, that is, by not fitting a member formed with through holes to the rotatable bearing race, lubricating oil can be sufficiently distributed in the bearing while the bearing is rotating.

Figure 3:
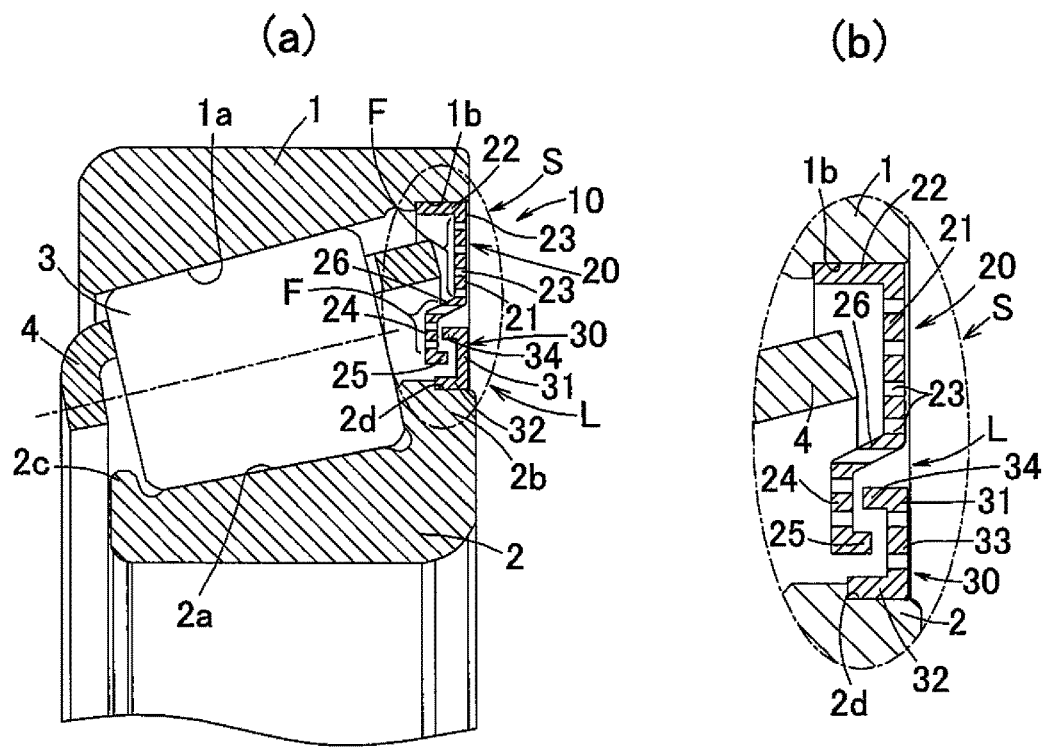
FIG. 3(a) is a partial enlarged sectional view of a third embodiment according to the present invention.
FIG. 3(b) is a partial enlarged view of a modification of the third embodiment.

FIG. 3(a) shows a rolling bearing 10 according to the third embodiment of the present invention, and FIG. 3(b) shows a modification of the third embodiment.

In the embodiment of FIG. 3(a), a protrusion 25 extends axially outwardly, i.e. in the direction away from the rolling elements 3, from the distal edge (i.e. the edge on the side of the inner bearing race) of the relief portion 24 of the ring member 20 of the second embodiment, and a protrusion 34 extends axially inwardly, i.e. toward the rolling elements 3, from the distal edge (i.e. the edge on the side of the outer bearing race 1) of the side portion of the sub-ring member 30 of the second embodiment.

The protrusion 25 of the ring member 20 protrudes into the space defined between the fitting portion 32 and the protrusion 34, of the sub-ring member 30. Thus, a gap constituting a labyrinth seal L is defined between the protrusion 25, relief portion 24 and connecting portion 26, of the ring member 20, and the fitting portion 32, side portion 31 and protrusion 34, of the sub-ring member 30.

In the embodiment of FIG. 3(a), no through holes 33 are formed in the sub-ring member 30 mounted to the rotatable bearing race. In the modified example shown in FIG. 3(b), the through holes 23 and 33 are formed, respectively, in the ring member 20, which is mounted to the stationary bearing race, and the sub-ring member 30, which is mounted to the rotatable bearing race, so that both ring members 20 and 30 serve as filters F.

Figure 4:
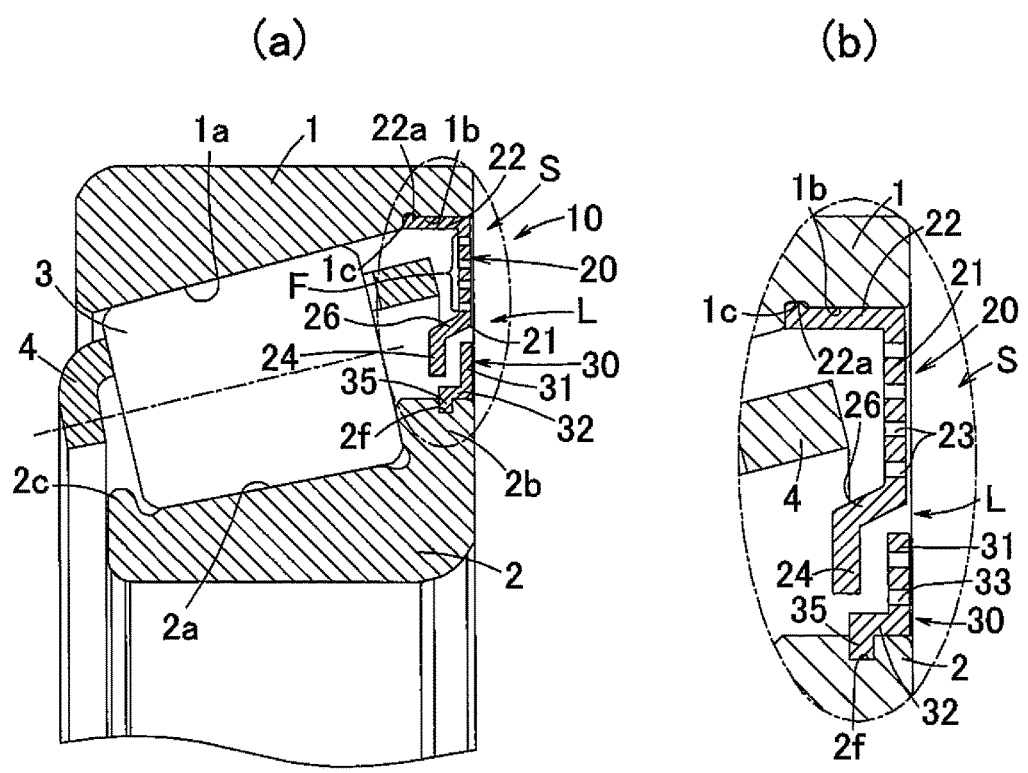
FIG. 4(a) is a partial enlarged sectional view of a fourth embodiment according to the present invention.
FIG. 4(b) is a partial enlarged view of a modification of the fourth embodiment.

FIG. 4(a) shows a rolling bearing 10 according to the fourth embodiment of the present invention, and FIG. 4(b) shows a modification of the fourth embodiment.

The embodiment of FIG. 4(a) is based on the second embodiment, and further includes an axial pull-out prevention means between the ring member 20 and the outer, fixed bearing race 1, to which the ring member 20 is mounted.

The pull-out prevention means includes a pull-out prevention recess portion $1c$ formed in the fitting recess $1b$ of the outer bearing race 1, and a fitting protrusion $22a$ provided at the end of the fitting portion 22 of the ring member 20 and engaged in the pull-out prevention recess portion $1c$.

By providing the pull-out prevention means between the ring member 20 and the outer bearing race 1, which are separate members from each other, it is possible to prevent wear due to relative slippage between the ring member 20 and the outer bearing race 1, thereby preventing deterioration in sealing properties.

In the same manner as with the ring member 20, another axial pull-out prevention means is provided between the sub-ring member 30 and the inner, rotatable bearing race 2, to which the sub-ring member 30 is mounted.

This pull-out prevention means includes a pull-out prevention recess $2f$ formed in the outer surface of the inner bearing race 2, and a fitting protrusion 35 provided at the end of the fitting portion 32 of the sub-ring member 30 and engaged in the pull-out prevention recess $2f$. With this arrangement, it is possible to prevent wear due to relative slippage between the sub-ring member 30 and the inner bearing race 2, thereby preventing deterioration in sealing properties.

In the embodiment of FIG. 4(a), the sub-ring member 30, which is mounted to the rotatable bearing race, has no through holes 33 and thus no function as a filter F. In the modification shown in FIG. 4(b), however, as in the modification of FIG. 3(b), the through holes 23 and 33 are formed in the ring member 30 mounted to the stationary bearing race and the sub-ring member 30 mounted to the rotatable bearing race, respectively, so that the ring member 20 and the sub-ring member 30 both have the function as filters F.

The pull-out prevention means of the fourth embodiment may be used in any other embodiments.

FIG. 5(a) shows a rolling bearing 10 according to the fifth embodiment of the present invention, and FIG. 5(b) shows a modification of the fifth embodiment.

The fifth embodiment includes, as with the fourth embodiment, an axial pull-out prevention means provided between the ring member 20 and the stationary, outer bearing race, and another axial pull-out prevention means provided between the sub-ring member 30 and the rotatable, inner bearing race.

In this embodiment, the ring member 20 includes a fitting portion 22 fitted in a fitting recess $1e$ formed in the outer surface of the outer bearing race 1 with an interference fit, and a side portion 21 integral with the fitting portion 22 and extending radially inwardly from the fitting portion 22. This ring member 20 also includes the relief portion 24 and the connecting portion 26 used in the previous embodiments.

The pull-out prevention means for the ring member 20 includes a pull-out prevention recess portion $1d$ formed in the fitting recess $1e$ of the outer bearing race 1, and a fitting protrusion 27 provided at the end of the fitting portion 22 of the ring member 20 and engaged in the pull-out prevention recess portion $1d$.

The pull-out prevention means for the sub-ring member 30 includes a pull-out prevention recess 2f formed in the outer surface of the inner bearing race 2, and a fitting protrusion 35 provided at the end of the fitting portion 32 of the sub-ring member 30 and engaged in the pull-out prevention recess 2f.

One of the pull-out prevention means for the ring member 20 and the pull-out prevention means for the sub-ring member 30 may be omitted.

Figure 5:
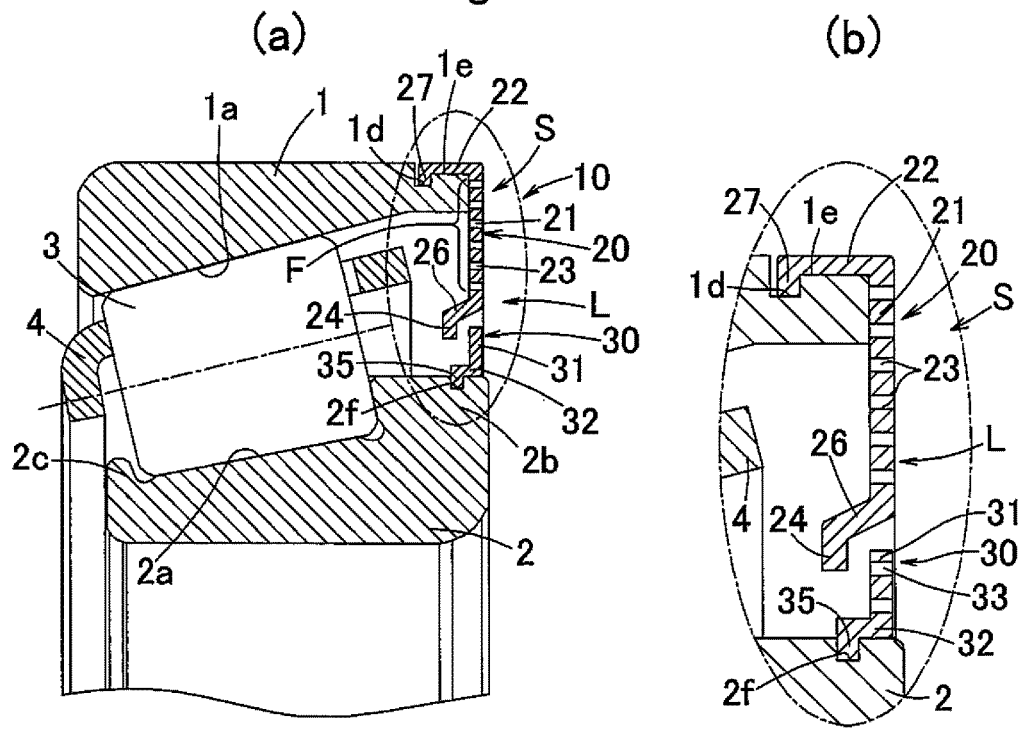
FIG. 5(a) is a partial enlarged sectional view of a fifth embodiment according to the present invention.
FIG. 5(b) is a partial enlarged view of a modification of the fifth embodiment.

In the embodiment of FIG. 5(*a*), the sub-ring member 30, which is mounted to the rotatable bearing race, has no through holes 33 and thus no function as a filter F. In the modification shown in FIG. 5(*b*), however, as in the modification of FIG. 3(*b*), the through holes 23 and 33 are formed in the ring member 30 mounted to the stationary bearing race and the sub-ring member 30 mounted to the rotatable bearing race, respectively, so that the ring member 20 and the sub-ring member 30 both have the function as filters F.

Figure 6:
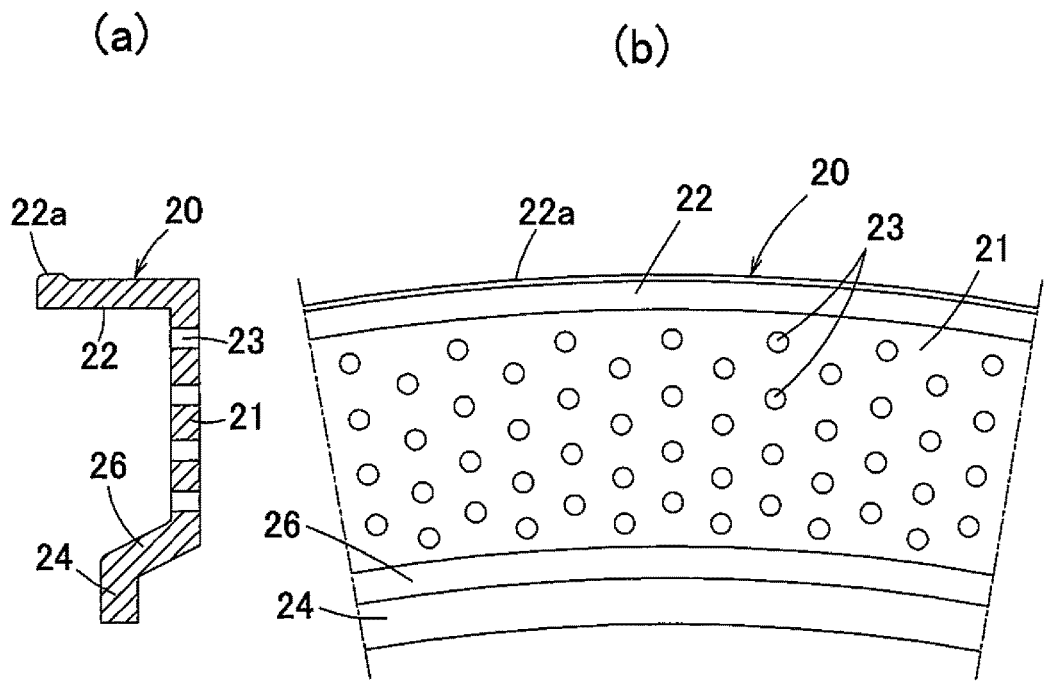
FIGS. 6(a) and 6(b) are a sectional view and a partial side view, respectively, of a ring member formed with through holes.

FIGS. 6(*a*) and 6(*b*) show a portion of the ring member 20 of the fourth embodiment.

The ring member 20 according to the present invention is an annular member formed, as described earlier, by pressing a metal so as to have the through holes 23 in large number. In the example shown in FIGS. 6(*a*) and 6(*b*), the through holes 23 are formed in the portion of the ring member 20 other than its surface fitted to the bearing race, and its portion forming the labyrinth seal L (including the distal edge portion of the side portion 21, the connecting portion 26, the relief portion 24). For the sub-ring member 30 too, the through holes 33 may be formed only in the portion of the sub-ring member 30 other than its surface fitted to the bearing race. Alternatively, the through holes 33 may be formed over the entire surface of the sub-ring member 30.

In any of the above embodiments, the ring member 20 and the sub-ring member 30 are annular members formed by pressing stainless steel and formed with large numbers of the through holes 23 and 33, but instead, they may be manufactured from a metal other than stainless steel. Also, the ring member 20 and the sub-ring member 30 may be annular members formed by injection-molding a resin so as to have large number of the through holes.

If the ring member 20 and the sub-ring member 30 are formed of a resin, such a resin may be a hard plastic such as polyamide resin. Under Japanese Industrial Standards (JIS), a "hard plastic" is defined as a plastic of which the bending modulus of tension modulus is higher than 700 MPa. Such a hard plastic is therefore higher in elastic modulus than an elastic seal member comprising an elastomer, and thus less likely to be deformed under an external force. Further alternatively, the ring member 20 and the sub-ring member 30 may be formed of a glass fiber-reinforced resin. A glass fiber-reinforced resin is also higher in elastic modulus than an elastic seal member comprising an elastomer, and thus is less likely to be deformed under an external force.

Figure 8:
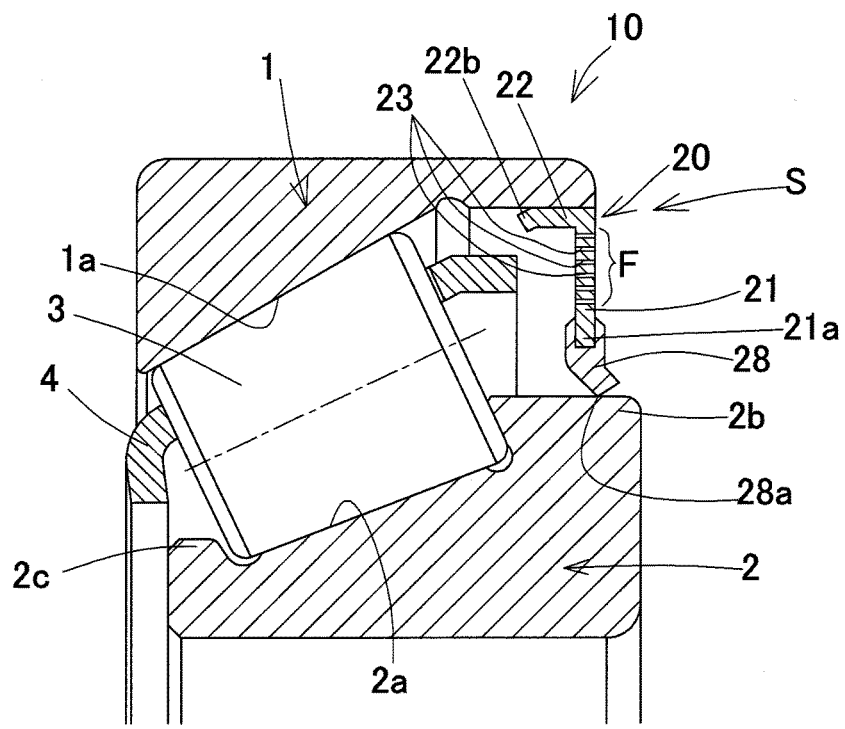
FIG. 8 is a partial enlarged sectional view of a sixth embodiment according to the present invention.

FIG. 8 is a partial enlarged sectional view of a rolling bearing according to the sixth embodiment of the present invention. While the rolling bearings 10 of the sixth to eighth embodiments are tapered roller bearings which are supposed to be used in a hydraulic pump, the present invention is applicable to rolling bearings used for other purposes.

In the eighth embodiment, the outer bearing race 1 is fitted to a fixed and non-rotatable housing (not shown), and thus non-rotatable, and the inner bearing race 2 is fitted to a rotary shaft (not shown) rotatable about its axis, and thus is rotatable together with the rotary shaft. That is, as with any of the above embodiments, the outer bearing race 1 is stationary, and the inner bearing race 2 is rotatable.

The seal device S includes a ring member 20 integrally formed with a filter F which allows passage of lubricating oil and restricts passage of solid foreign objects, and a lip 28 joined to a ring member 20 and formed of a material softer than the ring member 20.

Specifically, the lip 28 is made of rubber, namely an elastomer, while the ring member 20 is made of a metal such as stainless steel. That is, the material forming the ring member 20 is harder than the elastomer forming the lip 28. The ring member 20 may be made of a metal other than stainless steel, such as a cold rolled steel plate including SPCC, which can be shaped easily. Otherwise, the ring member 20 may also be made of an elastomer harder than the lip 28, or a synthetic resin harder than the lip 28, especially a hard resin.

Figure 9:
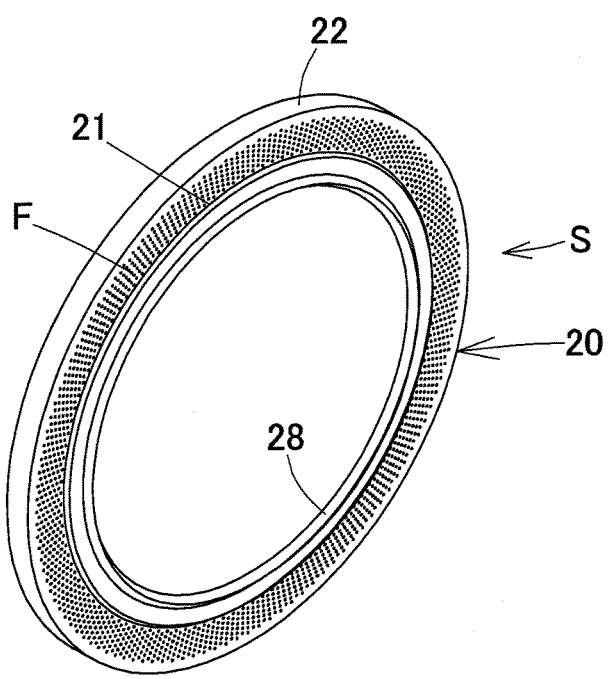
FIG. 9 is a perspective view of a seal device used in the sixth embodiment.

As shown in FIG. 9, the ring member 20 includes a cylindrical fitting portion (engaging portion) 22 extending along the radially inner surface of the outer bearing race 1, and a side portion (wall portion) 21 extending from the axially outer end edge of the fitting portion 22, over the entire circumference of the fitting portion 22, toward the inner bearing race 2.

The side portion 21 has a distal edge portion 21*a* to which the lip 28, which is annular in shape, is joined. In this embodiment, the lip 28 is fixed to the side portion 21 by fitting the distal edge portion 21*a* of the side portion 21, which is annular in shape, in a fitting groove formed in the lip 28 to extend the entire circumference of the lip 28. However, the lip 28 may be fixed to the side portion 21 in a different manner. For example, in order to fix the lip 28 to the side portion 21, an adhesive may be used in addition to the fixing arrangement shown in FIG. 8, or instead of the fixing arrangement shown in FIG. 8, the lip 28 may be fixed the side portion 21 by vulcanized adhesion, or by means of an adhesive.

The ring member 20 further includes a guide portion 22*b* provided at the axially inner end edge of the fitting portion 22 so as to be bent or curved toward the inner bearing race 2. The guide portion 22*b* makes it easier to insert the ring member 20 into the outer bearing race 1.

Figure 13:
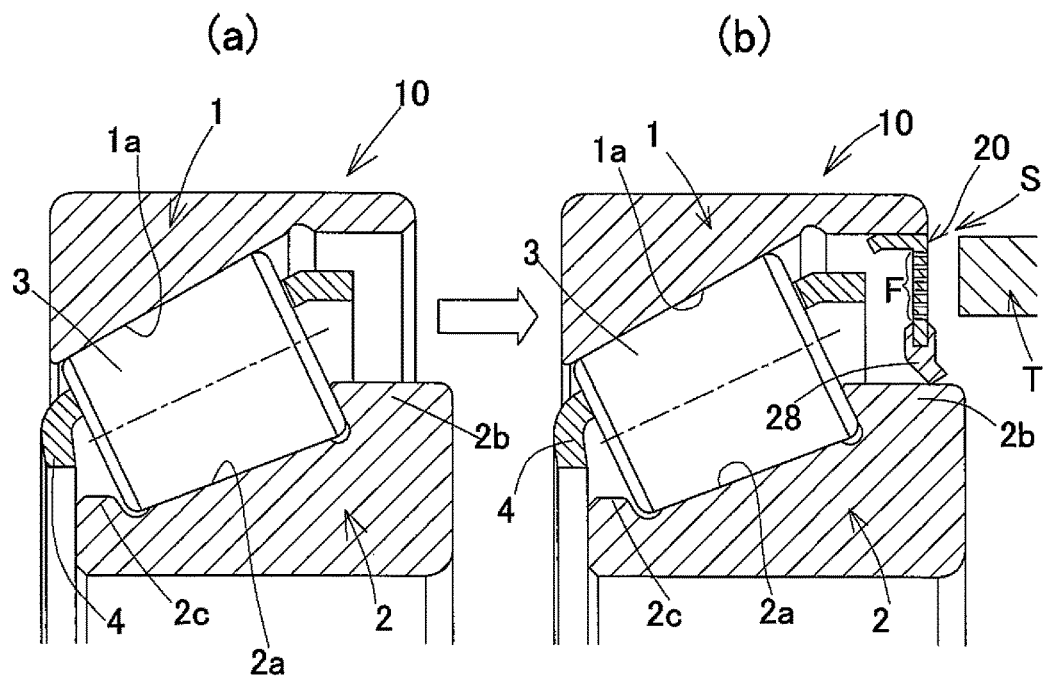
FIGS. 13(a) and 13(b) are partial enlarged sectional views showing how the seal device is mounted to the bearing.

FIG. 13 shows how the ring member 20 is inserted into the outer bearing race 1. In particular, with the ring member 20 positioned such that the fitting portion 22 faces the bearing, the ring member 20 is inserted into the annular opening defined between the outer bearing race 1 and the inner bearing race 2 until the opening is covered by the ring member 20. A jig T may be used to easily insert the ring member 20 into the opening. Such a jig T may be a rod-shaped member which can push a portion of the circumferential outer peripheral portion of the ring member 20, or an annular member which can push the entire circumferential peripheral portion of the ring member 20.

As with the other embodiments, the side portion 21 of the ring member 20 is formed with a large number of through holes 23, and constitutes a filter F. Such through holes 23 may be formed only in the side portion 21, or formed in the side portion 21, and additionally in a portion of the ring member 20 other than the side portion 21, such as the fitting portion 22.

The ring member 20 is press-fitted into the bearing space with the fitting portion 22 extending along the radially inner surface of the outer bearing race 1, and thus the ring member 20 is fitted inside the outer bearing race 1 with the distal edge portion 28*a* of the lip 28 facing the radially outer surface of the inner bearing race 2. In this embodiment, the distal edge portion 28*a* of the lip 28 is tapered and faces the radially outer surface of the large flange 2*b* of the inner bearing race 2. Over the entire circumference, the lip 28 extends in the direction perpendicular to the axis of the bearing from its portion mounted to the side portion 21 toward the axis of the bearing, with the distal edge portion 28a thereof slightly bent axially outward.

Since the lip 28, which comprises an elastomer, a relatively soft material, is joined to the ring member 20, which is integrally formed with a filter F, the ring member 20 is securely fitted to one of the bearing races, so that the ring member 20 maintains its function as the filter F for a prolonged period of time, while the lip 28 is pressed against the other bearing race at an appropriate contact pressure, so that it maintains its function for a long period of time.

Since the relatively hard ring member 20 is fitted to one of the bearing races, while the relatively soft lip 28 is not directly fixed to the other bearing race, it is not necessary to control the dimensions of the lip, which is made of a soft material such as an elastomer and of other bearing parts so strictly as in conventional arrangements. Also, since the ring member 20 is resistant to deformation under an external force compared to the materials forming conventional lips 28, so that the ring member 28 can maintain its function as the filter F for a prolonged period of time, which in turn extends the life of the bearing.

Figure 10:
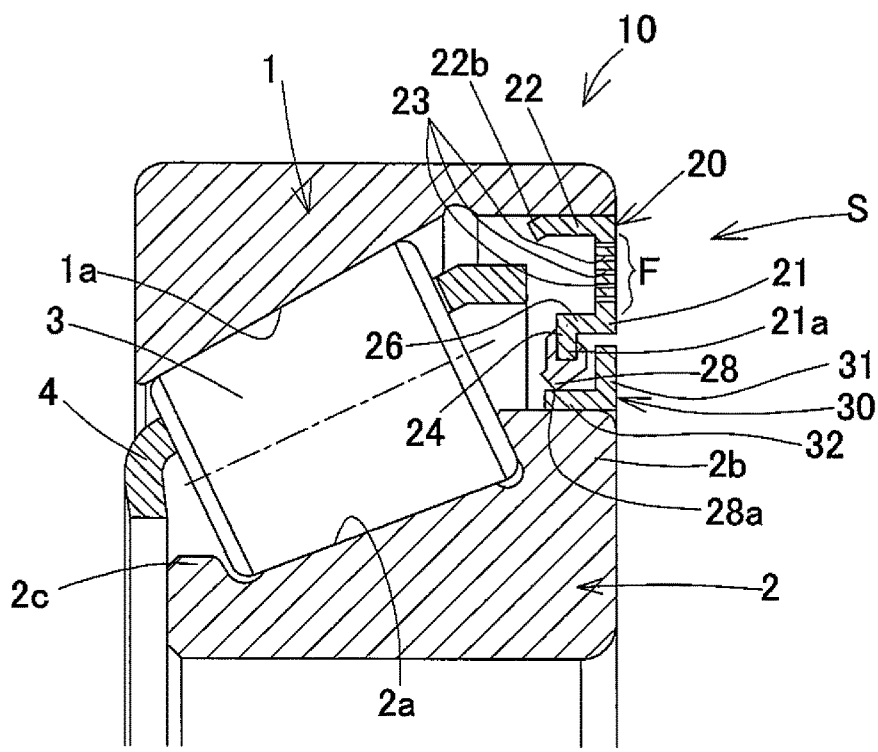
FIG. 10 is a partial enlarged sectional view of a seventh embodiment.

FIG. 10 shows the seventh embodiment of the present invention. In this embodiment, a sub-ring (auxiliary ring) member 30 is fitted to the bearing ring to which the ring member 20 is not fitted. In particular, the ring member 20 is fitted to the stationary, outer bearing race 1, while the sub-ring member 30 is fitted to the rotatable, inner bearing race 2.

The sub-ring member 30 is positioned to face the lip 28, which is joined to the ring member 20, such that a minute bent gap as a labyrinth structure (labyrinth seal structure) is defined between the sub-ring member 30 and the ring member 20. The labyrinth structure ensures expected sealing properties even though the rotatable member is not in contact with the stationary member. In particular, since the labyrinth structure of this embodiment comprises the minute bent gap, lubricating oil seals between the bearing space and the exterior of the bearing due to resistance when the lubricating oil passes through the minute gap.

In this (seventh) embodiment, the ring member 20 includes a cylindrical fitting portion 22 extending along the radially inner surface of the outer bearing race 1, and a side portion 21 extending from the axially outer end edge of the fitting portion 22 toward the inner bearing race 2, over the entire circumference of the fitting portion 22. The side portion 21 includes a relief portion 24 at its distal edge portion which is located radially inwardly of the portion of the side portion where the filter F is provided. The relief portion 24 is a plate-shaped portion having a surface extending parallel to a surface of the side portion 21, and is slightly displaced from the side portion 21 toward the rolling elements 3. The relief portion 24 is connected to the side portion 21 through a cylindrical connecting portion 26.

The lip 28, which is annular in shape, is joined to the distal edge portion 21a of the side portion 21. In the embodiment, the lip 28 extends, over the entire circumference thereof, in the direction perpendicular to the axis of the bearing. However, as in the first embodiment, the distal edge portion 28a may be slightly axially outwardly bent. The lip 28 is joined to the ring member 20 in the same manner as in the previous embodiments.

The sub-ring member 30 includes a cylindrical fitting portion (engaging portion) 32 extending along the radially outer surface of the inner bearing race 2, and a side portion (wall portion) 31 extending from the axially outer end edge of the fitting portion 32 toward the outer bearing race 1, over the entire circumference of the fitting portion 32, and thus has an L-shaped section.

The labyrinth structure is constituted by minute gaps defined between the lip 28 and the fitting portion 32 of the sub-ring member 30, between the lip 28 and the side portion 31 of the sub-ring member 30, and between the side portion 21 (including the relief portion 24 and the connecting portion 26) of the ring member 20 and the side portion 31 of the sub-ring member 30.

Figure 14:
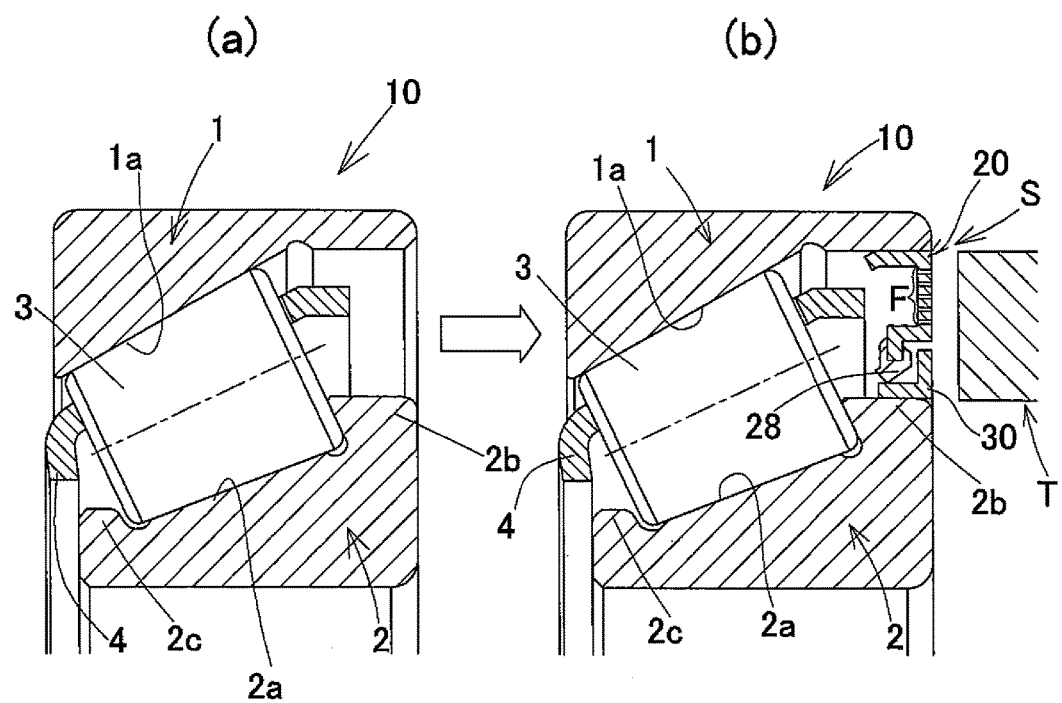
FIGS. 14(a) and 14(b) are partial enlarged sectional views showing how the seal device is mounted to the bearing.

FIG. 14 shows how the ring member 20 is inserted into the outer bearing race 1. In particular, with the ring member 20 positioned such that the fitting portion 22 faces the bearing, and the sub-ring member 30 positioned such that the fitting portion 32 faces the bearing, the ring member 20 and the sub-ring member 30 are inserted into the annular opening defined between the outer bearing race 1 and the inner bearing race 2 until the opening is covered by the ring members 20 and 30. For this purpose, one of the jigs T used in the sixth embodiment may be used.

Figure 11:
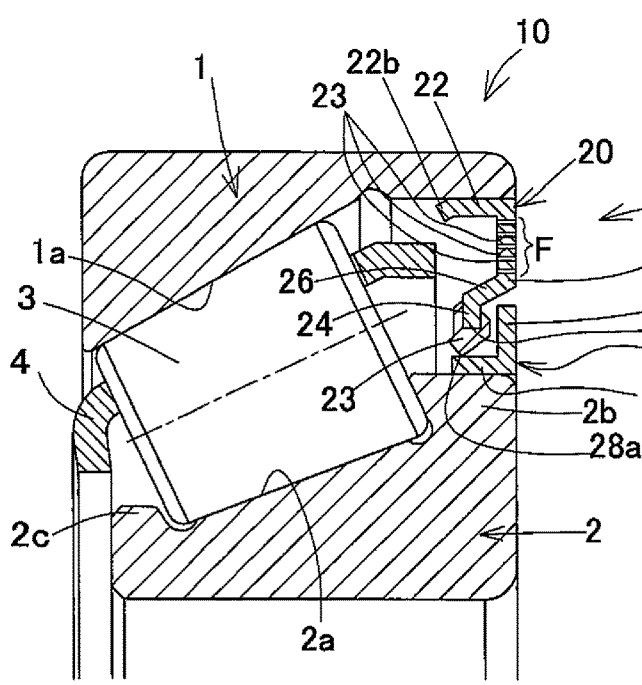
FIGS. 11(a) and 11(b) are partial enlarged sectional views of an eighth embodiment.
Figure 11:
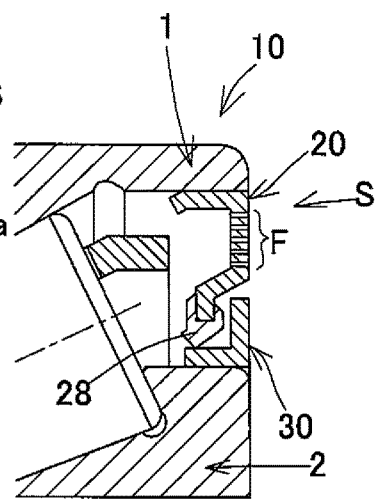
Figure 12:
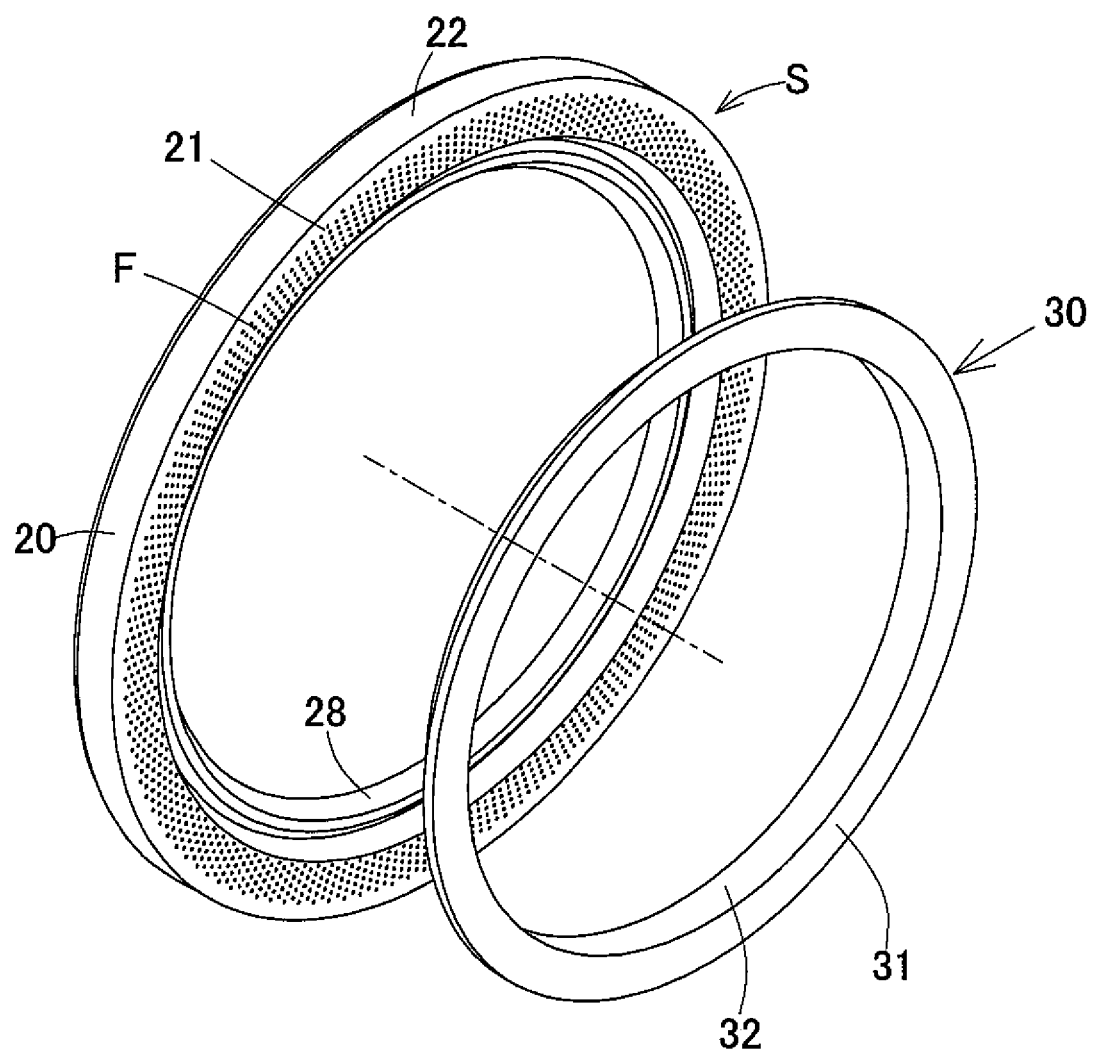
FIG. 12 is a perspective view of a seal device used in the eighth embodiment.

FIGS. 11 and 12 show the eighth embodiment of the present invention. In the embodiment, the relief portion 24 and the connecting portion 26 of the ring member 20 are different in shape from those of the seventh embodiment.

The ring member 20 includes a cylindrical fitting portion 22 extending along the radially inner surface of the outer bearing race 1, and a side portion 21 extending from the axially outer end edge of the fitting portion 22 toward the inner bearing race 2, over the entire circumference of the fitting portion 22. The connecting portion 26 of the side portion 21 is a conical member provided radially inwardly of the filter portion F to extend obliquely radially inwardly and axially inwardly. The relief portion 24 of the side portion 21 is a plate-shaped member having a surface extending parallel to a surface of the side portion 21. Otherwise, this embodiment is structurally identical to the seventh embodiment. In this embodiment, since the connecting portion 26 has a conical inclined surface, it can be formed easily from a metal or a resin.

In any of the sixth to eighth embodiments, the lip 28 is configured such that while the outer bearing race 1 and the inner bearing race 2 are not rotating or rotating at a low speed, relative to each other, the lip 28 is kept in contact with the bearing race facing the lip 28 (inner bearing race 2 in the embodiments), or a member fixed to this bearing race (auxiliary ring member 30), and while the outer bearing race 1 and the inner bearing race 2 are rotating at a high speed relative to each other, the lip 28 is kept out of contact with the above-mentioned bearing race or member.

In particular, since the lip 28, which is made of an elastomer, is joined to the ring member 20, which is integrally formed with the filter F, while the bearing is not rotating or rotating at a low speed, entry of foreign substances is prevented because the lip 28 is in contact with the bearing race facing the lip 28 or a member fixed to this bearing race, and while the bearing is rotating at a high speed, a gap forms between the bearing race facing the lip 28 or the member fixed to this bearing race, because the lip and the above bearing race or member are made of different materials and thus different in linear expansion coefficient, and as a result, these members are thermally expanded to different degrees from each other.

More specifically, while the bearing is not rotating or rotating at a low speed, since lubricating oil is at a relatively low temperature, there will be no big difference in the amount of thermal expansion in the radially outward direction of the bearing between the lip 28 and the bearing race facing the lip 28 or the member fitted to this bearing race, such as the sub-ring member 30, compared to when the bearing is cold. However, while the bearing is rotating at a high speed, since the lubricating oil is at a relatively high temperature, there will be a relatively large difference in the amount of thermal expansion in the radially outward direction of the bearing between the lip 28 and the bearing race facing the lip 28 or the member fitted to this bearing race, such as the sub-ring member 30. In particular, the lip 28 is expanded in the radially outward direction to a relatively large degree, while the bearing race facing the lip 28 or the member fitted to this bearing race, such as the sub-ring member 30 is not expanded to such a large degree as is the lip 28. As a result, a gap forms between the lip and the member facing the lip 28, or the initially set interference of the lip 28 decreases. This prevents increases in torque and temperature of the bearing while the bearing is rotating at a high speed, and further prevents excessive wear of the lip 28.

For the above-described reasons, the lip 28, which is joined to the ring member 20, is preferably made of a material higher in thermal expansion coefficient than the materials forming the ring member 20, the sub-ring member 30 and the bearing races. Since, generally speaking, metals are lower in thermal expansion coefficient than rubbers and resins, and also generally speaking, hard resins are lower in thermal expansion coefficient than rubbers, if the ring member 20 and the sub-ring member 30 are annular members made of metal or hard resin, and the lip 28 is made of an elastomer such as rubber, the above requirement is easily met. Alternatively, in order to achieve the above-described difference in thermal expansion coefficient, the ring member 20 and the sub-ring member 30 may comprise annular members made of metal, and the lip 28 may be made of resin; or further alternatively, the ring member 20 and the sub-ring member 30 may comprise annular members made of resin, and the lip 28 is made of a resin which is softer, and higher in thermal expansion coefficient, than the material forming the ring member 20 and the sub-ring member 30.

By setting the gap that forms between the above two members, namely, the lip 28 and the bearing race facing the lip or the member fitted to this bearing race while the bearing is rotating is preferably so as to be smaller than foreign objects that could shorten the life of the bearing, it is possible to positively prevent shortening of the life of the bearing. The gap that forms between the above two members while the bearing is rotating at a high speed can be calculated based on the rising amount of the temperature and the linear expansion coefficients of the above two members.

As described earlier, the filter F should be formed at least somewhere of the ring member 22 other than the fitting portion 22, which is fitted to the corresponding bearing race, and may be formed over the entire surface of the ring member 20. This is also the case for the filter F of the sub-ring member 30.

Figure 15:
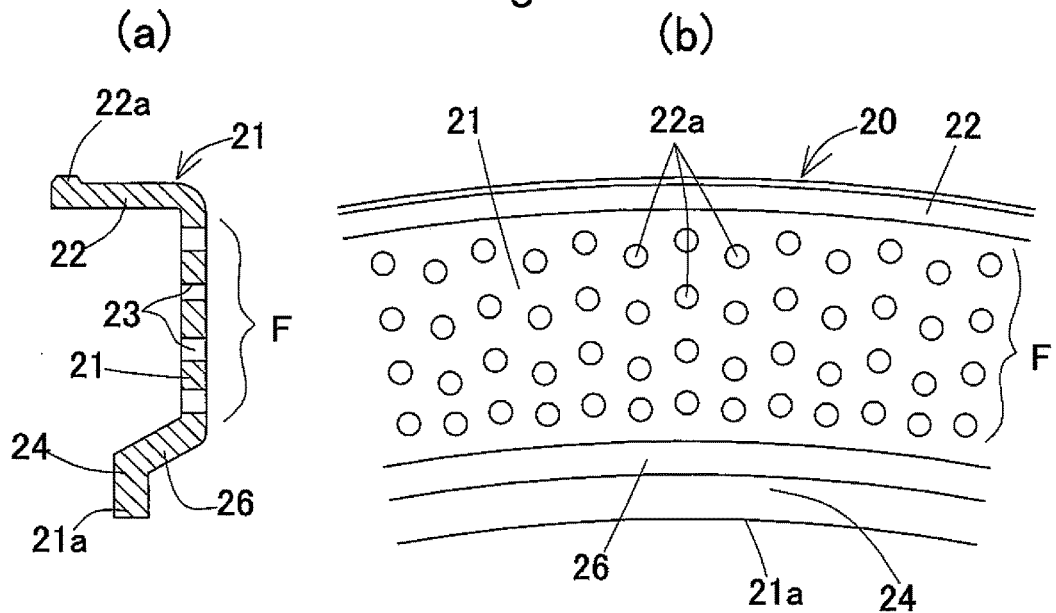
FIGS. 15(a) and 15(b) are a partial enlarged sectional view and a right-hand side view, respectively, of a ring member of the seal device.

For example, in FIG. 15, the filter F is formed in a portion of the side portion 21, and formed neither in the fitting portion 22, which is fitted to the corresponding bearing race, nor the relief portion 24, the connecting portion 26, and the distal edge portion 21a, to which the lip 28 is mounted. As mentioned earlier, numeral 22a in FIG. 15 indicates the fitting protrusion provided over the entire circumference. The fitting protrusion 22a is engaged in the fitting groove formed in the corresponding bearing race, thereby preventing the ring member 20 from being pulled out of the bearing race. This fitting protrusion 22a may be provided in any other embodiment.

The filter F may be formed in the fitting portion 22, the relief portion 24, the connecting portion 26, and/or the distal edge portion 21a, to which the lip 28 is mounted. The filter F may not necessarily be formed in the sub-ring member 30, but may be formed such that the filter F does not impair the sealing effect by the labyrinth seal structure.

Figure 16:
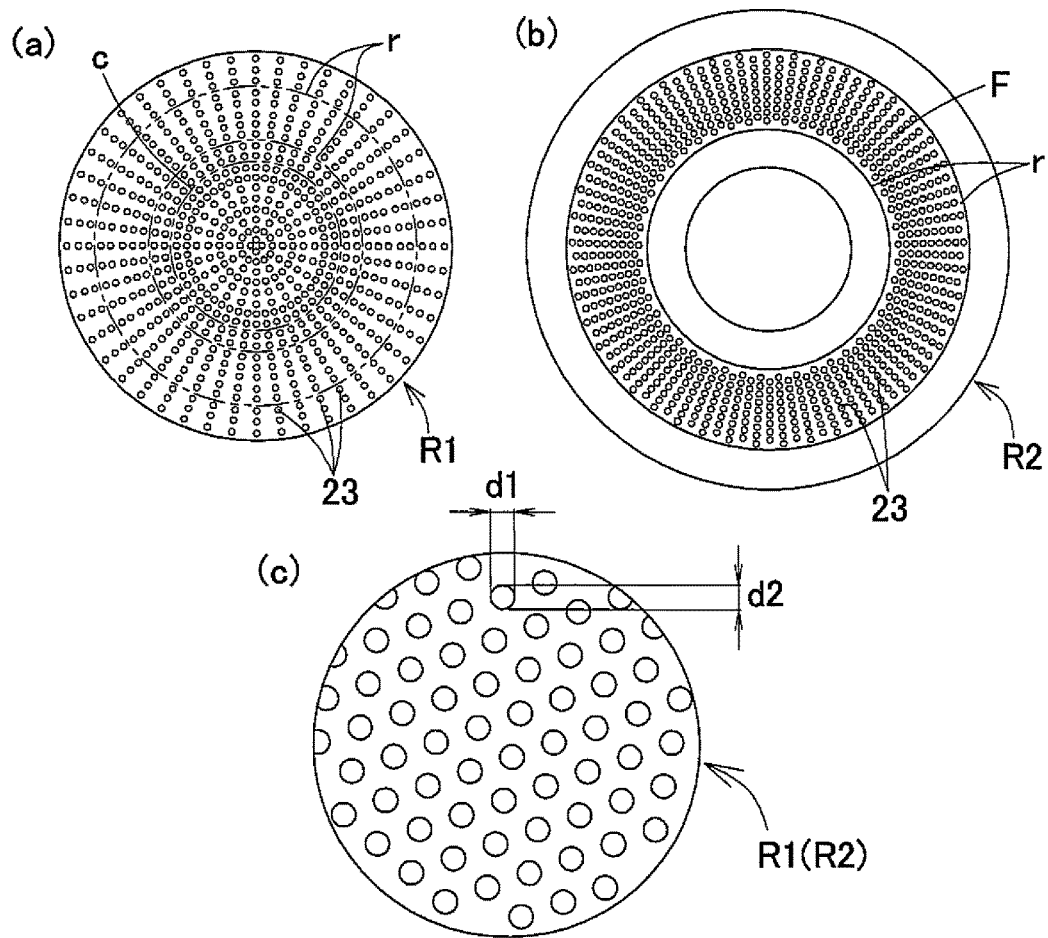
FIGS. 16(a) and 16(b) are entire views of a blank to be formed into the ring member of the seal device.
FIG. 16(c) is a partial enlarged view of FIGS. 16(a) and 16(b).

FIG. 16(a) shows a blank R1 to be formed into the ring member 20. The blank R1 is a circular metal plate formed by pressing and having the through holes 23 in large number. To form the ring member 20 from this blank R1, the blank is first formed into a doughnut shape by punching the central portion of the blank along a circular cut line c shown in FIG. 16(a), and then bent along a plurality of concentric circular bend lines r. FIG. 16(b) shows a circular metal blank R2 which is formed by pressing and of which the through holes 23 are formed only in its portion corresponding to the side portion 21. As with the blank R1, the blank R2 is formed into the ring member 20 by bending it along a plurality of concentric circular bend lines r. FIG. 16(c) is a partial enlarged view showing through holes 23 arranged in a lattice pattern, while the through holes 23 shown in FIG. 16(a) are arranged in radial directions about the axis of the ring member 20.

By forming the ring member 20 from a blank in the form of annular metal members (such as punched metal blanks) formed by pressing, the filter F is formed by a large number of through holes 23 formed during the pressing. Alternatively, the filter F may be formed by a large number of through holes 23 formed when forming the ring member 20 by injection-molding a resin.

The through holes 23 in the embodiment are true circles, of which the inner diameters in all directions, including the inner diameters d1 and d2 shown in FIG. 16(c), are equal to each other. However, oval through holes 23 may be used of which the inner diameters d1 and d2 are different from each other. Further alternatively, the through holes 23 may be rectangular through holes. Also, the through holes 23 may be aligned in one and another directions perpendicular to each other so that the filter F forms a net. In this case, the shape of the individual through holes 23 is not limited. The through holes 33 of the sub-ring member 30 may also be shaped and arranged in the above-described manner.

The elastomer used for the lip 28 may be nitrile rubber (NBR), hydrogenated nitrile rubber (HNBR), acrylic rubber (ACM), silicone rubber (VMQ), fluororubber (FKM), ethylene propylene rubber (EPDM), or styrene butadiene rubber (SBR). If a synthetic resin is used for the ring member 20, such a synthetic resin may be polyamide.

How the interference of the lip 28 is calculated is shown below. The interference of the lip is determined such that while the bearing is not rotating or rotating at a low speed, the lip 23 is fitted with interference, and while the bearing is rotating at a high speed, a gap small enough to prevent entry of harmful foreign substances into the bearing forms.

The table of FIG. 17 shows the interferences of the lip 28 when the temperature difference between the inner bearing race 2 and the lip 28 is 10° C. As shown, while the bearing is not rotating (25° C.), the interference is 0.3, and while the bearing is rotating at a high speed (where, for example, the bearing temperature is 80° C. and the lip temperature is 70° C.), the interference is −0.53 mm (0.53 mm gap). This gap (0.53 mm) is small enough to prevent entry of foreign substances that could have significantly detrimental influences on the life of the bearing.

The interferences were calculated under the following conditions:
Linear expansion coefficient of the seal lip (NBR): $2 \times 10^{-4}$;
Linear expansion coefficient of the inner bearing race (SUJ2): 12.5×10-6; and
Initial interference: 0.3 mm (Inner diameter of the seal lip: 99.7 mm; and
Outer diameter of the inner bearing race: 100 mm)

In each embodiment, each of the through holes 23 and 33 forming the respective filters F preferably has a maximum inner diameter of 0.3 to 0.7 mm. The maximum inner diameter refers to the largest one of the inner diameters in all directions of each through hole, including the inner diameters d1 and d2 shown in FIG. 16(*c*). The through holes 23 and 33 are especially preferably circular through holes having maximum inner diameters of 0.5 mm. However, taking into consideration the manufacturing errors of the actual product, the maximum inner diameters are determined within the range of 0.3 to 0.7 mm. If the filters comprise nets, the diameters of the through holes 23 and 33 (mesh sizes) are preferably within the range of 0.3 to 0.7 mm. The maximum inner diameters of the through holes 23 and 33 are equal to the maximum particle diameters of foreign substances that can pass through the respective through holes 23 and 33. The mesh size refers to the opening of the mesh.

If the through holes 23 and 33 forming the filters F are too large, large foreign substances tend to infiltrate into the bearing, thus leaving large impressions on the bearing raceways and on the rolling surfaces that could have significantly detrimental influences on the life of the bearing. Conversely, if the through holes 23 and 33 are too small, the mesh could get clogged with foreign substances to such an extent that no lubricating oil can be supplied into the bearing.

Bearings were subjected to a life test in which the sizes of the impressions formed on the bearing raceways and the rolling surfaces were measured, and the rate at which the length of life of each bearing is shortened due to the impressions was measured. The test results show that impressions smaller than a predetermined size do not influence the life of the bearings. In a separate experiment, the relationship was determined between the sizes of the through holes 23 and 33 forming the filters F and the sizes of impressions formed by foreign substances that have passed through the through holes 23 and 33.

Figure 18:
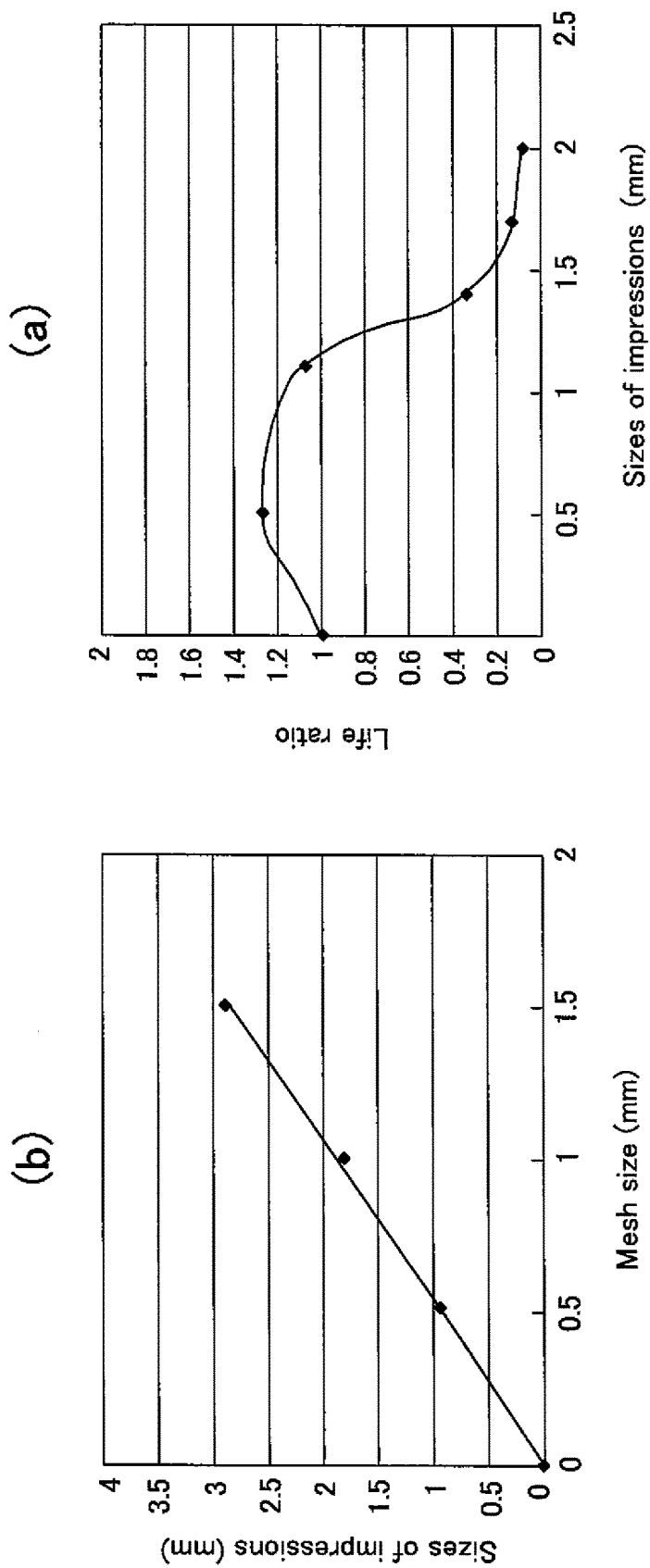
FIG. 18(a) is a graph showing the relationship between the sizes of impressions and the rate at which the life is shortened.
FIG. 18(b) is a graph showing the relationship between the mesh size of a filter and the sizes of impressions.

FIGS. 18(*a*) and 18(*b*) show the results of the life test and the experiment, respectively. FIG. 18(*a*) shows the relationship between the sizes of impressions formed on the bearing raceways and rolling surfaces and the rate at which the length of life of the bearing is shortened due to the impressions. FIG. 18(*b*) shows the relationship between the mesh size and the sizes of impressions formed by foreign substances that have passed through the mesh.

The bearings used for the life test and the experiment were tapered roller bearings measuring 30 mm in inner diameter, 62 mm in outer diameter, and 17.25 mm, and the bearings were rotated at 2000 $\text{min}^{-1}$, while being subjected to a radial load of 17.65 kN, and an axial load of 1.47 kN.

In the life test, it was confirmed that where the impressions formed on the bearing raceways and the rolling surfaces are larger than 1 mm, the life rate drops sharply. In the experiment, it was confirmed that where the mesh size is 0.5 mm or less, it is possible to prevent entry of foreign substances that could leave impressions larger than 1 mm. Thus, by limiting the mesh size to 0.5 mm or less, a sufficiently long bearing life is ensured. By limiting the filter size to 0.7 mm or less, impressions formed are 1.3 mm or less. By limiting the impressions to 1.3 mm or less, it is possible to limit the rate at which the length of life of the rolling bearing is shortened to a low level (to 0.6 in life rate compared to a bearing free of impressions). In other words, by limiting the maximum inner diameters of the through holes 23 to 0.7 mm or less, the life rate of the bearing is 0.6 or lower, so that it is possible to prevent a significant drop in the length of life of the bearing. In order to prevent clogging, the mesh size is preferably 0.3 mm or over.

In any of the above embodiments, the ring member 20 having the filter F is fitted to the stationary, outer bearing race 1, and if the sub-ring member 30 is used, the sub-ring member 30 is fitted to the rotatable, inner bearing race 2. By fitting the ring member 20, which has the filter F through which lubricating oil can pass, to the stationary bearing race, lubricating oil can smoothly pass through the filter F even while the bearing is rotating. The filter F is preferably fitted to the stationary bearing race.

Thus, if, conversely to the above arrangement, the inner bearing race 2 is stationary and the outer bearing race is rotatable, the ring member 20 is preferably fitted to the inner bearing race 2, and if the auxiliary ring member 30 is used, the auxiliary ring member 30 is fitted to the outer bearing race 1.

If the ring member 20 is fitted to the inner bearing race 2, the ring member 20 would comprise a cylindrical fitting portion 22 extending along the radially outer surface of the inner bearing race 2, and a side portion 21 extending from the axially outer end edge of the fitting portion 22 toward the outer bearing race 1. If the sub-ring member 30 is used in this arrangement, the sub-ring member 30 would comprise a cylindrical fitting portion 32 extending along the radially inner surface of the outer bearing race 1, and a side portion 31 extending, over the entire circumference, from the axially outer end edge of the fitting portion 32 toward the inner bearing race 2 such that the sub-ring member 30 has an L-shaped section. Since this arrangement is otherwise the same as the previous embodiments, except that the positional relations are reversed in the radial direction in this arrangement, its additional description is omitted.

In any of the above embodiments, the rolling bearing 10 is a tapered roller bearing, but the rolling bearing 10 according to the present invention is not limited to a tapered roller bearing. For example, the rolling bearing 10 may be a deep groove ball bearing or an angular ball bearing which includes balls as the rolling elements 3 mounted between an outer race as the outer bearing race 1 and an inner race as the inner bearing race 2, and retained in position by a retainer. Further alternatively, the rolling bearing 10 may be a cylindrical roller bearing which includes cylindrical rollers as the rolling elements mounted between an outer race as the outer bearing race 1 and an inner race as the inner bearing race 2, and retained in position by a retainer; or may be a self-aligning rolling bearing including spherical rollers. Among them, since a tapered roller bearing is configured such that the outer bearing race 1 is easily separable, the ring member 20 and/or the sub-ring member 30 can be easily replaced with new ones if e.g. foreign substances are adhered to or around the through holes 23 and 33.

To any type of these rolling bearings 10, the seal device S is mounted to the bearing to cover one of the two axial openings of the bearing. If necessary, another similar seal device S may be mounted to the bearing to cover the other axial opening. In either case, it is necessary to provide a space at the axial opening in which the seal device S (or each seal device 5) is mounted so that the seal device S will not interfere with the retainer 4 or the rolling elements 3.

What is claimed is:

1. A rolling bearing comprising an outer bearing race and an inner bearing race defining a bearing space between the outer bearing race and the inner bearing race and the bearing space comprising axial openings, rolling elements mounted in the bearing space, and a seal device at at least one of the axial openings of the bearing space, the seal device including a metal ring member with through holes defined directly in the metal ring member, wherein the metal ring member alone is a filter in which the through holes are configured such that lubricating oil can pass through the through holes and solid foreign substances cannot pass through the through holes.

2. The rolling bearing of claim 1, wherein one of the outer bearing race and the inner bearing race constitutes a stationary bearing race, and the other of the outer bearing race and the inner bearing race constitutes a rotatable bearing race, wherein the metal ring member is in engagement with the stationary bearing race, and wherein a gap constituting a labyrinth seal structure is defined between the metal ring member and the rotatable bearing race.

3. The rolling bearing of claim 2, further comprising an axial pull-out prevention arrangement between the metal ring member and the stationary bearing race.

4. The rolling bearing of claim 2, wherein the through holes are defined over an entire surface of the metal ring member or only at a portion of the surface of the metal ring member that is not fitted to the stationary bearing race, and wherein the metal ring member is an annular member formed by pressing a metal.

5. The rolling bearing of claim 1, wherein one of the outer bearing race and the inner bearing race constitutes a stationary bearing race, and the other of the outer bearing race and the inner bearing race constitutes a rotatable bearing race, wherein the metal ring member is in engagement with the stationary bearing race, wherein the seal device further includes a metal or resin sub-ring member fixed to the rotatable bearing race, and wherein a gap constituting a labyrinth seal structure is defined between the metal ring member and the metal or resin sub-ring member.

6. The rolling bearing of claim 5, further comprising an axial pull-out prevention arrangement between the metal or resin sub-ring member and the rotatable bearing race.

7. The rolling bearing of claim 6, wherein the metal ring member is fitted to the stationary bearing race with an interference fit, and the metal or resin sub-ring member is fitted to the rotatable bearing race with an interference fit.

8. The rolling bearing of claim 5, wherein the metal ring member is fitted to the stationary bearing race with an interference fit, and the metal or resin sub-ring member is fitted to the rotatable bearing race with an interference fit.

9. The rolling bearing of claim 5, wherein the through holes are defined over an entire surface of the metal ring member or only at a portion of the surface of the metal ring member that is not fitted to the stationary bearing race, and wherein the metal ring member is an annular member formed by pressing a metal.

10. The rolling bearing of claim 1, wherein the through holes are defined over an entire surface of the metal ring member or only at a portion of the surface of the metal ring member that is not fitted to the stationary bearing race, and wherein the metal ring member is an annular member formed by pressing a metal.

11. The rolling bearing of claim 1, wherein the metal ring member is fitted to one of the outer bearing race and the inner bearing race, and the seal device further includes a lip made of a material softer than the metal ring member and joined to the metal ring member so as to face the other of the outer bearing race and the inner bearing race.

12. The rolling bearing of claim 11, wherein the seal device further includes a sub-ring member fitted to the other of the outer bearing race and the inner bearing race so as to face the lip joined to the metal ring member, such that a labyrinth structure is defined between the sub-ring member and the metal ring member.

13. The rolling bearing of claim 11, wherein one of the inner bearing race and the outer bearing race is a stationary bearing race, and wherein the metal ring member is fitted to the stationary bearing race.

14. The rolling bearing of claim 13, wherein the inner bearing race is a rotatable bearing race, and the outer bearing race is the stationary bearing race, and wherein the metal ring member is fitted to the outer bearing race.

15. The rolling bearing of claim 11, wherein the through holes are defined over an entire surface of the metal ring member or only at a portion of the surface of the metal ring member that is not fitted to the one of the outer bearing race and the inner bearing race.

16. The rolling bearing of claim 15, wherein the metal ring member is an annular member, of which the through holes are defined by pressing.

17. A rolling bearing comprising an outer bearing race and an inner bearing race defining a bearing space between the outer bearing race and the inner bearing race and the bearing space comprising axial openings, rolling elements mounted in the bearing space, and a seal device at at least one of the axial openings of the bearing space, wherein:
one of the outer bearing race and the inner bearing race constitutes a stationary bearing race, and the other of the outer bearing race and the inner bearing race constitutes a rotatable bearing race,
the seal device includes a metal or resin ring member with through holes configured such that lubricating oil can pass through the through holes of the metal or resin ring member and solid foreign substances cannot pass through the through holes of the metal or resin ring member, the metal or resin ring member being in engagement with the stationary bearing race,
the seal device further includes a metal or resin sub-ring member fixed to the rotatable bearing race, the metal or resin sub-ring member including through holes configured such that lubricating oil can pass through the through holes of the metal or resin sub-ring member and solid foreign substances cannot pass through the through holes of the metal or resin sub-ring member, and
a gap constituting a labyrinth seal structure is defined between the metal or resin ring member and the metal or resin sub-ring member.

18. The rolling bearing of claim 17, further including an axial pull-out prevention arrangement between the metal or resin sub-ring member and the rotatable bearing race.

19. The rolling bearing of claim 17, wherein the metal or resin ring member is fitted to the stationary bearing race with an interference fit, and the metal or resin sub-ring member is fitted to the rotatable bearing race with an interference fit.

20. A rolling bearing comprising an outer bearing race and an inner bearing race defining a bearing space between the outer bearing race and the inner bearing race and the bearing space comprising axial openings, rolling elements mounted in the bearing space, and a seal device at at least one of the axial openings of the bearing space,
wherein:
the seal device includes a metal or resin ring member with through holes,
the through holes are configured such that lubricating oil can pass through the through holes and solid foreign substances cannot pass through the through holes,
the metal or resin ring member is fitted to one of the outer bearing race and the inner bearing race,
the seal device further includes a lip made of a material softer than the metal or resin ring member and joined to the metal or resin ring member so as to face the other of the outer bearing race and the inner bearing race, and
the lip is configured such that, in a state in which the outer bearing race and the inner bearing race are not rotating or rotating at a low speed about an axis relative to each other, the lip is in contact with the other of the outer bearing race and the inner bearing race or a member fixed to the other of the outer bearing race and the inner bearing race, and in a state in which the outer bearing race and the inner bearing race are rotating at a high speed about the axis relative to each other, the lip is kept out of contact with the other of the outer bearing race and the inner bearing race or the member fixed to the other of the outer bearing race and the inner bearing race.

* * * * *